(12) United States Patent
Hankins et al.

(10) Patent No.: US 10,389,583 B2
(45) Date of Patent: *Aug. 20, 2019

(54) IMPLICIT TRAFFIC ENGINEERING

(71) Applicant: Cradlepoint, Inc., Boise, ID (US)

(72) Inventors: Scott Andrew Hankins, Cupertino, CA (US); Andrew John Mastracci, San Jose, CA (US)

(73) Assignee: Cradlepoint, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/045,624

(22) Filed: Jul. 25, 2018

(65) Prior Publication Data
US 2018/0331902 A1 Nov. 15, 2018

Related U.S. Application Data

(63) Continuation of application No. 15/940,870, filed on Mar. 29, 2018, which is a continuation of application No. 13/844,254, filed on Mar. 15, 2013, now Pat. No. 9,992,062, which is a continuation-in-part of application No. 13/831,306, filed on Mar. 14, 2013, now Pat. No. 10,135,677, which is a continuation-in-part of application No. 13/829,611, filed on Mar. 14, 2013, now Pat. No. 10,110,417, which is a continuation-in-part of application No. 13/802,529, filed on Mar. 13, 2013, now Pat. No. 10,177,957, which is a continuation-in-part of application No. 13/747,371, filed on Jan. 22, 2013, now abandoned, which is a continuation-in-part of application No. 13/675,552, filed on Nov. 13, 2012, which is a continuation-in-part of application No.
(Continued)

(51) Int. Cl.
*H04L 12/24* (2006.01)
*H04L 12/18* (2006.01)
*H04L 12/28* (2006.01)
*H04L 12/46* (2006.01)

(52) U.S. Cl.
CPC ........ *H04L 41/0813* (2013.01); *H04L 12/185* (2013.01); *H04L 12/1836* (2013.01); *H04L 12/1877* (2013.01); *H04L 41/0823* (2013.01); *H04L 12/28* (2013.01); *H04L 12/4679* (2013.01); *H04L 41/0816* (2013.01); *H04L 41/0893* (2013.01); *H04L 41/12* (2013.01)

(58) Field of Classification Search
None
See application file for complete search history.

(56) References Cited

U.S. PATENT DOCUMENTS 5,548,646 A 8/1996 Aziz et al.
5,968,126 A * 10/1999 Ekstrom ............. H04L 12/4679
370/409

(Continued)

OTHER PUBLICATIONS

Mitchell, Bradley, "What is a subnet?" retrieved from http://compnetworking.about.com on Nov. 1, 2015, 3 pages.
(Continued)

*Primary Examiner* — Backhean Tiv
(74) *Attorney, Agent, or Firm* — Berkeley Law & Technology Group, LLP

(57) ABSTRACT

Briefly, methods and/or apparatuses for implicit traffic engineering, such as for the Internet, are described.

41 Claims, 6 Drawing Sheets

Related U.S. Application Data

13/543,729, filed on Jul. 6, 2012, now Pat. No. 9,118,495.

(56) References Cited

U.S. PATENT DOCUMENTS

| | | | |
|---|---|---|---|
| 6,055,568 A * | 4/2000 | Adams | G06F 15/17312 |
| | | | 709/220 |
| 6,269,404 B1 | 7/2001 | Hart | |
| 6,442,169 B1 | 8/2002 | Lewis | |
| 6,457,061 B1 | 9/2002 | Bal et al. | |
| 6,487,600 B1 * | 11/2002 | Lynch | H04L 29/06 |
| | | | 709/204 |
| 6,516,417 B1 * | 2/2003 | Pegrum | H04L 63/0272 |
| | | | 709/225 |
| 6,614,774 B1 * | 9/2003 | Wang | H04L 29/12066 |
| | | | 370/338 |
| 6,640,251 B1 | 10/2003 | Wiget | |
| 6,781,982 B1 | 8/2004 | Borella | |
| 6,847,620 B1 | 1/2005 | Meier | |
| 6,877,041 B2 | 4/2005 | Sullivan | |
| 6,937,566 B1 | 8/2005 | Forslow | |
| 7,000,012 B2 | 2/2006 | Moore et al. | |
| 7,000,015 B2 | 2/2006 | Moore et al. | |
| 7,000,079 B2 | 2/2006 | Moore et al. | |
| 7,039,687 B1 * | 5/2006 | Jamieson | H04L 12/4675 |
| | | | 370/392 |
| 7,043,540 B2 | 5/2006 | Moore et al. | |
| 7,072,964 B1 | 7/2006 | Whittle | |
| 7,119,713 B2 * | 10/2006 | Shuey | H04Q 9/00 |
| | | | 340/870.02 |
| 7,194,622 B1 | 3/2007 | Halasz | |
| 7,447,166 B1 | 11/2008 | Kaluve et al. | |
| 7,480,710 B1 * | 1/2009 | Olson | H04L 29/12264 |
| | | | 709/223 |
| 7,644,437 B2 | 1/2010 | Volpano | |
| 7,760,632 B2 | 7/2010 | Yano | |
| 7,774,837 B2 | 8/2010 | McAllister | |
| 7,937,471 B2 | 5/2011 | Alkhatib | |
| 7,941,837 B1 | 5/2011 | Jiang | |
| 7,954,145 B2 * | 5/2011 | Mohanty | H04L 12/4641 |
| | | | 709/225 |
| 7,961,725 B2 | 6/2011 | Nagarajan et al. | |
| 8,036,664 B2 | 10/2011 | Khetawat et al. | |
| 8,041,824 B1 * | 10/2011 | Maeng | H04L 63/10 |
| | | | 709/229 |
| 8,116,226 B1 | 2/2012 | Liao | |
| 8,150,397 B2 | 4/2012 | Khetawat et al. | |
| 8,159,986 B2 | 4/2012 | Yun et al. | |
| 8,170,037 B2 * | 5/2012 | Polcha | H04N 21/2381 |
| | | | 370/382 |
| 8,189,600 B2 | 5/2012 | Jabr | |
| 8,204,502 B2 | 6/2012 | Khetawat et al. | |
| 8,228,818 B2 | 7/2012 | Chase et al. | |
| 8,230,051 B1 * | 7/2012 | Zahavi | H04L 41/5009 |
| | | | 709/203 |
| 8,327,437 B2 | 12/2012 | McAllister | |
| 8,422,380 B2 * | 4/2013 | Gaskill | H04B 3/542 |
| | | | 370/252 |
| 8,428,049 B2 | 4/2013 | Gass | |
| 8,477,775 B2 | 7/2013 | Choudhary et al. | |
| 8,595,359 B2 * | 11/2013 | Shaffer | H04W 4/70 |
| | | | 709/225 |
| 8,619,771 B2 | 12/2013 | Lambeth | |
| 8,644,188 B1 | 2/2014 | Brandwine | |
| 8,660,129 B1 | 2/2014 | Brendel | |
| 8,966,027 B1 | 2/2015 | Brandwine | |
| 9,032,077 B1 * | 5/2015 | Klein | H04L 29/08 |
| | | | 370/395.21 |
| 9,118,495 B1 * | 8/2015 | Hankins | H04L 12/4641 |
| 9,154,327 B1 | 10/2015 | Marino | |
| 9,306,910 B2 | 4/2016 | Lambeth | |
| 9,356,833 B2 | 5/2016 | Xu | |
| 9,392,313 B2 | 7/2016 | Bugenhagen | |
| 9,888,097 B2 | 2/2018 | Lambeth | |
| 9,900,410 B2 | 2/2018 | Dalal | |
| 9,973,415 B2 * | 5/2018 | Cheng | H04L 12/4633 |
| 9,992,062 B1 * | 6/2018 | Hankins | H04L 12/1836 |
| 10,110,417 B1 * | 10/2018 | Hankins | H04L 41/04 |
| 10,135,677 B1 * | 11/2018 | Hankins | H04L 12/4641 |
| 10,177,957 B1 * | 1/2019 | Hankins | H04L 63/20 |
| 2001/0042131 A1 * | 11/2001 | Mathon | G06Q 30/06 |
| | | | 709/238 |
| 2001/0047407 A1 | 11/2001 | Moore et al. | |
| 2002/0012327 A1 * | 1/2002 | Okada | H04L 12/189 |
| | | | 370/328 |
| 2002/0032780 A1 | 3/2002 | Moore et al. | |
| 2002/0057684 A1 | 5/2002 | Miyamoto | |
| 2002/0065906 A1 * | 5/2002 | Davidson | H04L 29/12009 |
| | | | 709/222 |
| 2003/0009540 A1 * | 1/2003 | Benfield | H04L 41/0213 |
| | | | 709/220 |
| 2003/0051195 A1 * | 3/2003 | Bosa | H04L 41/0618 |
| | | | 714/43 |
| 2003/0140131 A1 * | 7/2003 | Chandrashekhar | |
| | | | H04L 12/4641 |
| | | | 709/223 |
| 2003/0198208 A1 * | 10/2003 | Koos, Jr. | H04W 88/04 |
| | | | 370/338 |
| 2003/0200295 A1 | 10/2003 | Roberts et al. | |
| 2004/0032856 A1 * | 2/2004 | Sandstrom | H04L 45/00 |
| | | | 370/351 |
| 2004/0156345 A1 | 8/2004 | Steer et al. | |
| 2004/0252722 A1 | 12/2004 | Wybenga | |
| 2005/0076339 A1 | 4/2005 | Merril | |
| 2005/0154790 A1 | 7/2005 | Nagata et al. | |
| 2005/0190705 A1 | 9/2005 | Moore et al. | |
| 2005/0208947 A1 * | 9/2005 | Bahl | H04L 12/4633 |
| | | | 455/450 |
| 2006/0215582 A1 | 9/2006 | Castagnoli et al. | |
| 2007/0070937 A1 * | 3/2007 | Demirhan | H04W 72/06 |
| | | | 370/328 |
| 2007/0121565 A1 | 5/2007 | Halasz et al. | |
| 2007/0195800 A1 | 8/2007 | Yang | |
| 2007/0234419 A1 | 10/2007 | Shouno | |
| 2008/0049777 A1 | 2/2008 | Morrill et al. | |
| 2008/0076419 A1 | 3/2008 | Khetawat et al. | |
| 2008/0089334 A1 * | 4/2008 | Soja-Molloy | H04L 45/00 |
| | | | 370/392 |
| 2008/0101366 A1 * | 5/2008 | Venkitaraman | H04L 12/4633 |
| | | | 370/392 |
| 2008/0101367 A1 | 5/2008 | Weinman | |
| 2008/0114863 A1 | 5/2008 | Baskey et al. | |
| 2008/0183853 A1 | 7/2008 | Manion | |
| 2009/0034431 A1 | 2/2009 | Nagarajan et al. | |
| 2009/0046714 A1 | 2/2009 | Holmer et al. | |
| 2009/0059930 A1 * | 3/2009 | Ryan | H04L 12/4679 |
| | | | 370/395.53 |
| 2009/0086742 A1 | 4/2009 | Ghai | |
| 2009/0106394 A1 | 4/2009 | Lin et al. | |
| 2009/0129386 A1 | 5/2009 | Rune | |
| 2009/0138620 A1 | 5/2009 | Johnson et al. | |
| 2009/0213859 A1 | 8/2009 | De Silva | |
| 2009/0300750 A1 * | 12/2009 | Chou | H04L 63/029 |
| | | | 726/12 |
| 2009/0310610 A1 * | 12/2009 | Sandstrom | H04L 45/00 |
| | | | 370/392 |
| 2010/0023958 A1 | 1/2010 | Bugenhagen | |
| 2010/0061288 A1 | 3/2010 | Yun et al. | |
| 2010/0061724 A1 | 3/2010 | Sun | |
| 2010/0180014 A1 | 7/2010 | Kannan et al. | |
| 2010/0290398 A1 | 11/2010 | Choudhary et al. | |
| 2010/0322251 A1 | 12/2010 | Li | |
| 2011/0122834 A1 | 5/2011 | Walker | |
| 2011/0162060 A1 * | 6/2011 | Vijayakumar | H04L 12/413 |
| | | | 726/13 |
| 2011/0252230 A1 * | 10/2011 | Segre | H04L 63/162 |
| | | | 713/155 |
| 2011/0261828 A1 | 10/2011 | Smith | |
| 2012/0014387 A1 | 1/2012 | Dunbar | |
| 2012/0063451 A1 | 3/2012 | Keesara | |
| 2012/0315882 A1 | 12/2012 | Chang et al. | |

(56) References Cited

U.S. PATENT DOCUMENTS

| | | |
|---|---|---|
| 2013/0044629 A1 | 2/2013 | Biswas |
| 2013/0060966 A1 | 3/2013 | Moisiadis |
| 2013/0121154 A1* | 5/2013 | Guay .................. H04L 45/125 370/236 |
| 2013/0121209 A1 | 5/2013 | Padmanabhan |
| 2013/0163594 A1 | 6/2013 | Sharma |
| 2013/0182712 A1* | 7/2013 | Aguayo .............. H04L 12/4633 370/395.53 |
| 2013/0250951 A1 | 9/2013 | Koganti |
| 2013/0276090 A1 | 10/2013 | Kopti |
| 2013/0287022 A1 | 10/2013 | Banavalikar |
| 2013/0287026 A1 | 10/2013 | Davie |
| 2013/0347072 A1* | 12/2013 | Dinha ................. H04L 63/0272 726/4 |
| 2014/0040750 A1 | 2/2014 | B. et al. |
| 2014/0112343 A1 | 4/2014 | Lambeth et al. |
| 2014/0133354 A1 | 5/2014 | Scharf |
| 2014/0244847 A1* | 8/2014 | Pouyllau ............. H04L 41/5006 709/226 |

OTHER PUBLICATIONS

Mitchell, Bradley, "What is a Local Area Network (LAN)?" retrieved from http://compnetworking.about.com on Nov. 1, 2015, 3 pages.

Christensson, P., "Domain Definition", 2006, retrieved from http://techterms.com on Nov. 1, 2015.

Indiana University, "What is a domain?" retrieved from https://kb.iu.edu/d/aoup on Nov. 1, 2015, 2 pages.

Aerohive Networks, "Areohive Demonstrates Industry First Bonjour Gateway to Enable Apple AirPlay and Apple AirPrint Actoss Multi-Subnet Enterprise Networks," Sunnyvale, CA, Mar. 5, 2012, 3 Pages.

Williams, "Pertino Offers a Cloud-Based Network, No Hardware Required," Feb. 12, 2013, www.techcrunch.com, 3 Pages.

McQuerry, Stephen, CCNA Self-Study (ICND Exam): Extending Switched Networks with Virtual LANs Dec 5, 2003.

U.S. Appl. No. 13/543,729, filed Jul. 6, 2012, 54 Pages.

U.S. Appl. No. 13/543,729: Filing Receipt, dated Jul. 23, 2012, 3 Pages.

U.S. Appl. No. 13/543,729: Application Data Sheet, dated Aug. 14, 2012, 7 Pages.

U.S. Appl. No. 13/543,729: Preliminary Amendment, dated Sep. 11, 2012, 6 Pages.

U.S. Appl. No. 13/543,729: Preliminary Amendment, dated Dec. 18, 2012, 15 Pages.

U.S. Appl. No. 13/543,729: Non-Final Office Action, dated Jan. 9, 2014, 20 Pages.

U.S. Appl. No. 13/543,729: Applicant Initiated Interview Summary (PTOL-413), dated Feb. 3, 2014, 3 Pages.

U.S. Appl. No. 13/543,729: Non-Final Office Action Response, dated Apr. 9, 2014, 36 Pages.

U.S. Appl. No. 13/543,729: Final Office Action, dated Apr. 30, 2014, 21 Pages.

U.S. Appl. No. 13/543,729: After Final Consideration Program Request, Mailed Jun. 30, 2014, 37 Pages.

U.S. Appl. No. 13/543,729: Amendment After Final or under 37 CFR 1.312, dated Jul. 9, 2014, 4 Pages.

U.S. Appl. No. 13/543,729: Request for Continued Examination, dated Jul. 16, 2014, 38 Pages.

U.S. Appl. No. 13/543,729: Notice of Allowance and Fees, dated Apr. 23, 2015, 24 pages.

U.S. Appl. No. 13/543,729: Filing Receipt, dated May 14, 2015, 3 pages.

U.S. Appl. No. 13/543,729: Issue Notification, dated Aug. 5, 2015, 1 page.

U.S. Appl. No. 13/675,552, filed Nov. 13, 2012, 66 Pages.

U.S. Appl. No. 13/675,552: Filing Receipt and Notice to File Corrected Application Papers, dated Dec. 12, 2012, 5 Pages.

U.S. Appl. No. 13/675,552: Applicant Response to Pre-Exam Formalities Notice, dated Jan. 3, 2013, 10 Pages.

U.S. Appl. No. 13/675,552: Filing Receipt, dated Jan. 11, 2013, 3 Pages.

U.S. Appl. No. 13/675,552: Preliminary Amendment, dated Apr. 2, 2013 4 Pages.

U.S. Appl. No. 13/675,552: Non-Final Rejection, dated Oct. 30, 2014, 18 Pages.

U.S. Appl. No. 13/675,552: Amendment/Req. Reconsideration After Non-Final Rejection dated Mar. 2, 2015, 21 pages.

U.S. Appl. No. 13/675,552: Final Rejection, dated Jun. 3, 2015, 19 pages.

U.S. Appl. No. 13/675,552: Request for Continued Examination and Amendments, filed Dec. 1, 2015, 33 pages.

U.S. Appl. No. 13/675,552: Non Final Rejection, dated Jan. 12, 2016, 20 pages.

U.S. Appl. No. 13/675,552: Amendment/Req. Reconsideration-After Non-Final Rejection, dated May 12, 2016, 18 pages.

U.S. Appl. No. 13/675,552: Final Rejection, dated Aug. 17, 2016, 15 pages.

U.S. Appl. No. 13/675,552: RCE and Amendments, dated Dec. 19, 2016, 23 pages.

U.S. Appl. No. 13/675,552: Non-Final Rejection, dated Apr. 3, 2017, 18 pages.

U.S. Appl. No. 13/675,552, Final Rejection, Amendment/Req. Reconsideration-After Non-Final Reject, dated Aug. 3, 2017, 27 pages.

U.S. Appl. No. 13/675,552: Final Rejection, dated Sep. 26, 2017, 21 pages.

U.S. Appl. No. 13/675,552: Response After Final Action, dated Dec. 26, 2017, 20 pages.

U.S. Appl. No. 13/675,552: After Final Consideration Program Decision, dated Jan. 2, 2018, 4 pages.

U.S. Appl. No. 13/675,552: RCE and Amendments, dated Jan. 26, 2018, 20 pages.

U.S. Appl. No. 13/675,552: Non-Final Rejection, dated Mar. 22, 2018, 19 pages.

U.S. Appl. No. 13/675,552: Application Data Sheet to update/correct info, dated Jun. 20, 2018, 8 pages.

U.S. Appl. No. 13/675,552: Filing Receipt, dated Jul. 10, 2018, 3 pages.

U.S. Appl. No. 13/675,552: Amendment/Req. Reconsideration-After Non-Final Rejection, dated Jul. 20, 2018, 19 pages.

U.S. Appl. No. 13/747,371, filed Jan. 22, 2013, 76 Pages.

U.S. Appl. No. 13/747,371: Notice to File Missing Parts and Filing Receipt, dated Feb. 15, 2013, 5 Pages.

U.S. Appl. No. 13/747,371: Application Data Sheet, dated Mar. 13, 2013, 5 Pages.

U.S. Appl. No. 13/747,371: Notice to File Missing Parts, dated Apr. 1, 2013, 22 Pages.

U.S. Appl. No. 13/747,371: Applicant Response to Pre-Exam Formalities Notice, dated Jun. 3, 2013, 16 Pages.

U.S. Appl. No. 13/747,371: Filing Receipt, dated Jun. 13, 2013, 3 Pages.

U.S. Appl. No. 13/747,371: Non-Final Rejection dated Mar. 2, 2015, 24 pages.

U.S. Appl. No. 13/747,371: Final Rejection dated Nov. 6, 2015, 41 pages.

U.S. Appl. No. 13/747,371: After Final Consideration Program Request, dated Jan. 7, 2016, 30 pages.

U.S. Appl. No. 13/747,371: Advisory Action and After Final Decision, dated Jan. 29, 2016, 18 pages.

U.S. Appl. No. 13/747,371: RCE, dated Mar. 4, 2016, 28 pages.

U.S. Appl. No. 13/747,371: Non-Final Rejection, dated Aug. 11, 2016, 8 pages.

U.S. Appl. No. 13/747,371: Abandonment, dated Feb. 23, 2017, 2 pages.

U.S. Appl. No. 15/348,902, filed Nov. 10, 2016, 79 pages.

U.S. Appl. No. 15/348,902: Preliminary Amendment, dated Nov. 10, 2016, 18 pages.

U.S. Appl. No. 15/348,902: Notice to File Missing Parts, dated Nov. 21, 2016, 3 pages.

U.S. Appl. No. 15/348,902: Filing Receipt, dated Nov. 21, 2016, 3 pages.

(56) References Cited

OTHER PUBLICATIONS

U.S. Appl. No. 15/348,902: Applicant Response to Pre-Exam Formalities Notice and Amendments, dated Jan. 23, 2017, 112 pages.
U.S. Appl. No. 15/348,902: Filing Receipt, dated Jan. 25, 2017, 3 pages.
U.S. Appl. No. 15/348,902: Application Data Sheet to update/correct info, dated Jun. 20, 2018, 8 pages.
U.S. Appl. No. 15/348,902: Filing Receipt, dated Jul. 10, 2018, 3 pages.
U.S. Appl. No. 13/802,529, filed Mar. 13, 2013, 81 Pages.
U.S. Appl. No. 13/802,529: Notice to File Missing Parts and Filing Receipt, dated Apr. 23, 2013, 5 Pages.
U.S. Appl. No. 13/802,529: Applicant Response to Pre-Exam Formalities Notice, dated May 10, 2013, 9 Pages.
U.S. Appl. No. 13/802,529: Filing Receipt, dated May 20, 2013, 3 Pages.
U.S. Appl. No. 13/802,529: Non-Final Office Action, dated Jul. 22, 2014, 17 Pages.
U.S. Appl. No. 13/802,529: Amendment/Req Reconsideration After Non-Final Reject, Filed Nov. 5, 2014, 28 Pages.
U.S. Appl. No. 13/802,529: Final Rejection dated Feb. 19, 2015, 27 pages.
U.S. Appl. No. 13/802,529: RCE and Amendments, filed Aug. 17, 2015, 25 pages.
U.S. Appl. No. 13/802,529: Non-Final Rejection, dated Dec. 29, 2015, 38 pages.
U.S. Appl. No. 13/802,529: Amendment/Req. Reconsideration-After Non-Final Rejection, dated Mar. 24, 2016.
U.S. Appl. No. 13/802,529: Final Rejection, dated Jul. 14, 2016, 38 pages.
U.S. Appl. No. 13/802,529: Response After Final Action, dated Oct. 14, 2016, 44 pages.
U.S. Appl. No. 13/802,529: Advisory Action, dated Nov. 7, 2016, 3 pages.
U.S. Appl. No. 13/802,529: Response After Final Action, dated Dec. 9, 2016, 27 pages.
U.S. Appl. No. 13/802,529: Advisory Action, dated Dec. 29, 2016, 4 pages.
U.S. Appl. No. 13/802,529: RCE and Amendments, dated Jan. 6, 2017, 25 pages.
U.S. Appl. No. 13/802,529: Non-Final Rejection, dated Mar. 29, 2017, 35 pages.
U.S. Appl. No. 13/802,529: Amendment/Req. Reconsideration-After Non-Final Reject, dated Jun. 29, 2017, 23 pages.
U.S. Appl. No. 13/802,529: Non-Final Rejection, dated Feb. 7, 2018, 35 pages.
U.S. Appl. No. 13/802,529: Application Data Sheet to update/correct info, dated Jun. 20, 2018, 7 pages.
U.S. Appl. No. 13/802,529: Filing Receipt, dated Jul. 10, 2018, 3 pages.
U.S. Appl. No. 13/802,529: Terminal Disclaimer, dated Aug. 8, 2018, 3 pages.
U.S. Appl. No. 13/829,611, filed Mar. 14, 2013, 83 Pages.
U.S. Appl. No. 13/829,611: Notice to File Missing Parts and Filing Receipt, dated May 2, 2013, 5 Pages.
U.S. Appl. No. 13/829,611: Applicant Response to Pre-Exam Formalities Notice, dated Jun. 7, 2013, 5 Pages.
U.S. Appl. No. 13/829,611: Filing Receipt, dated Jul. 9, 2013, 3 Pages.
U.S. Appl. No. 13/829,611: Non-Final Rejection, dated Jun. 16, 2015, 14 pages.
U.S. Appl. No. 13/829,611: Amendment/Req. Reconsideration After Non-Final Reject, filed Dec. 15, 2015, 22 pages.
U.S. Appl. No. 13/829,611: Final Rejection, dated Dec. 30, 2016, 16 pages.
U.S. Appl. No. 13/829,611: After Final Consideration Program Request, dated Mar. 24, 2016, 21 pages.
U.S. Appl. No. 13/829,611: Advisory Action and After Final Decision, dated Apr. 5, 2016, 7 pages.
U.S. Appl. No. 13/829,611: RCE, dated May 2, 2016, 25 pages.
U.S. Appl. No. 13/829,611: Non-Final Rejection, dated Jun. 16, 2016, 16 pages.
U.S. Appl. No. 13/829,611: Amendment/Req. Reconsideration-After Non-Final Reject, dated Sep. 16, 2016, 19 pages.
U.S. Appl. No. 13/829,611: Final Rejection, dated Oct. 5, 2017, 14 pages.
U.S. Appl. No. 13/829,611: Response After Final Action, dated Jan. 5, 2017, 17 pages.
U.S. Appl. No. 13/829,611: Advisory Action, dated Jan. 30, 2017, 3 pages.
U.S. Appl. No. 13/829,611: RCE and Amendments, dated Feb. 21, 2017, 20 pages.
U.S. Appl. No. 13/829,611: Non-Final Rejection, dated Mar. 23, 2017, 12 pages.
U.S. Appl. No. 13/829,611: Amendment/Req. Reconsideration-After Non-Final Reject, dated Jun. 22, 2017, 18 pages.
U.S. Appl. No. 13/829,611: Final Rejection, dated Sep. 12, 2017, 16 pages.
U.S. Appl. No. 13/829,611: After Final Consideration Program Request, dated Dec. 12, 2017, 17 pages.
U.S. Appl. No. 13/829,611: Advisory Action and Amendment, dated Dec. 27, 2017, 5 pages.
U.S. Appl. No. 13/829,611: RCE and Amendments, dated Mar. 7, 2018, 25 pages.
U.S. Appl. No. 13/829,611: Notice of Allowance and Fees Due, dated May 17, 2018, 13 pages.
U.S. Appl. No. 13/829,611: Notice of Allowance and Fees Due, dated Jun. 4, 2018, 2 pages.
U.S. Appl. No. 13/829,611: Request for Corrected Filing Receipt, dated Jun. 13, 2018, 7 pages.
U.S. Appl. No. 13/829,611: Filing Receipt, dated Jun. 18, 2018, 3 pages.
U.S. Appl. No. 13/829,611: Notice of allowance and Fees Due and Amendment, dated Aug. 3, 2018, 16 pages.
U.S. Appl. No. 13/829,611: Notice of allowance and Fees Due, dated Aug. 9, 2018, 2 pages.
U.S. Appl. No. 13/831,306, filed Mar. 14, 2013, 88 Pages.
U.S. Appl. No. 13/831,306: Notice to File Missing Parts and Filing Receipt, dated May 6, 2013, 5 Pages.
U.S. Appl. No. 13/831,306: Applicant Response to Pre-Exam Formalities Notice, dated Jun. 27, 2013, 6 Pages.
U.S. Appl. No. 13/831,306: Filing Receipt, dated Jul. 9, 2013, 3 Pages.
U.S. Appl. No. 13/831,306: Non-Final Rejection, dated Jun. 25, 2015, 13 pages.
U.S. Appl. No. 13/831,306: Amendment/Req. Reconsideration-After Non-Final Rejection, dated Dec. 28, 2016, 25 pages.
U.S. Appl. No. 13/831,306: Final Rejection, dated Mar. 22, 2016, 15 pages.
U.S. Appl. No. 13/831,306: Response After Final Action, dated Jul. 19, 2016, 19 pages.
U.S. Appl. No. 13/831,306: Advisory Action, dated Jul. 22, 2016, 3 pages.
U.S. Appl. No. 13/831,306: Filing Receipt, dated Jul. 27, 2016 4 pages.
U.S. Appl. No. 13/831,306: RCE and Amendments, dated Aug. 22, 2016, 10 pages.
U.S. Appl. No. 13/831,306: Non-Final Rejection, dated Sep. 28, 2016, 12 pages.
U.S. Appl. No. 13/831,306: Amendment/Req. Reconsideration-After Non-Final Reject, dated Jan. 6, 2017, 15 pages.
U.S. Appl. No. 13/831,306: Supplemental Response or Supplemental Amendment, dated Feb. 21, 2017, 16 pages.
U.S. Appl. No. 13/831,306: Final Rejection, dated Jun. 12, 2017, 11 pages.
U.S. Appl. No. 13/831,306: Response After Final Action, dated Aug. 14, 2017, 15 pages.
U.S. Appl. No. 13/831,306: Advisory Action, dated Aug. 30, 2017, 3 pages.
U.S. Appl. No. 13/831,306: RCE and Amendments, dated Sep. 12, 2017, 33 pages.
U.S. Appl. No. 13/831,306: Non-Final Rejection, dated Oct. 5, 2017, 15 pages.

(56) References Cited

OTHER PUBLICATIONS

U.S. Appl. No. 13/831,306: Amendment/Req. Reconsideration-After Non-Final Reject, dated Jan. 5, 2018.
U.S. Appl. No. 13/831,306: Final Rejection, dated May 1, 2018, 13 pages.
U.S. Appl. No. 13/831,306: After Final Consideration Program Request, dated May 10, 2018, 13 pages.
U.S. Appl. No. 13/831,306: Notice of Allowance and Fees Due, dated Jul. 11, 2018, 2 pages.
U.S. Appl. No. 13/831,306: Notice of Allowance and Fees Due, dated Jul. 23, 2018, 2 pages.
U.S. Appl. No. 13/831,306: Notice of Allowance and Fees Due, dated Aug. 3, 2018, 2 pages.
U.S. Appl. No. 13/831,306: Amendment after Notice of Allowance, dated Aug. 27, 2018, 11 pages.
U.S. Appl. No. 13/844,254, filed Mar. 15, 2013, 99 Pages.
U.S. Appl. No. 13/844,254: Notice to File Missing Parts and Filing Receipt, dated May 9, 2013, 5 Pages.
U.S. Appl. No. 13/844,254: Applicant Response to Pre-Exam Formalities Notice, dated Jun. 27, 2013, 5 Pages.
U.S. Appl. No. 13/844,254: Filing Receipt, dated Jul. 9, 2013, 3 Pages.
U.S. Appl. No. 13/844,254: Non-Final Rejection and Examiner Search, dated Aug. 4, 2015, 17 pages.
U.S. Appl. No. 13/844,254: Amendment/Req. Reconsideration-After Non-Final Rejection, dated Jan. 4, 2016, 40 pages.
U.S. Appl. No. 13/844,254: Final Rejection, dated Apr. 7, 2016, 27 pages.
U.S. Appl. No. 13/844,254: Response After Final Action, dated Jul. 7, 2016, 48 pages.
U.S. Appl. No. 13/844,254: Advisory Action, dated Jul. 20, 2016, 2 pages.
U.S. Appl. No. 13/844,254: RCE and Amendments, dated Aug. 8, 2016, 50 pages.
U.S. Appl. No. 13/844,254: Non-Final Rejection, dated Nov. 29, 2016, 13 pages.
U.S. Appl. No. 13/844,254: Amendment/Req. Reconsideration-After Non-Final Rejection, dated Feb. 28, 2017, 23 pages.
U.S. Appl. No. 13/844,254: Final Rejection, dated Apr. 26, 2017, 16 pages.
U.S. Appl. No. 13/844,254: Response After Final, dated Jun. 22, 2017, 17 pages.
U.S. Appl. No. 13/844,254: Advisory Action, dated Jun. 30, 2017, 5 pages.
U.S. Appl. No. 13/844,254: RCE and Amendments, dated Aug. 28, 2017, 21 pages.
U.S. Appl. No. 13/844,254: Notice of Allowance and Fees Due, dated Dec. 29, 2017.
U.S. Appl. No. 13/844,254: Notice of Allowance and Fees Due, dated Jan. 10, 2018, 2 pages.
U.S. Appl. No. 13/844,254: Amendment after Notice of Allowance, dated Mar. 21, 2018, 13 pages.
U.S. Appl. No. 13/844,254: Amendment after Notice of Allowance, dated Mar. 26, 2018, 12 pages.
U.S. Appl. No. 13/844,254: Issue Fee Payment, dated Mar. 28, 2018, 1 page.
U.S. Appl. No. 15/940,870: Application and Preliminary Amendment, dated Mar. 29, 2018, 114 pages.
U.S. Appl. No. 15/940,870: Notice to File Corrected Application Papers, dated Apr. 25, 2018, 2 pages.
U.S. Appl. No. 15/940,870: Filing Receipt, dated Apr. 25, 2018, 4 pages.
U.S. Appl. No. 15/940,870: Preliminary Amendment, dated Jun. 19, 2018, 185 pages.
U.S. Appl. No. 15/940,870: Filing Receipt, dated Jul. 10, 2018, 4 pages.
U.S. Appl. No. 15/940,870: Filing Receipt, dated Jul. 30, 2018, 4 pages.
U.S. Appl. No. 15/940,870: Request for Corrected Filing Receipt, dated Jul. 26, 2018, 11 pages.
U.S. Appl. No. 13/675,552, Non-Final Rejection, dated Mar. 14, 2019, 28 pages.
U.S. Appl. No. 15/348,902, Amendment/Req. Reconsideration-After Non-Final Rejection, dated Mar. 18, 2019, 34 pages.
U.S. Appl. No. 15/348,902, Final Rejection, dated Apr. 16, 2019, 30 pages.
U.S. Appl. No. 16/192,539, Non-Final Rejection, dated Apr. 1, 2019, 8 pages.
U.S. Appl. 16/128,985, Notice of Publication, dated Mar. 14, 2019, 1 page.
U.S. Appl. No. 16/405,825, Application as filed on May 7, 2019, 119 pages.
U.S. Appl. No. 16/405,825, Filing Receipt, dated May 17, 2019, 4 pages.

* cited by examiner

IMPLICIT TRAFFIC ENGINEERING

FIELD

The present application relates to traffic engineering and, more particularly, to implicit traffic engineering, such as for the Internet.

BACKGROUND

Various advancements in networking address interoperability of one or more devices across one or more networks. Two different physical networks may communicate via a network device. A network device, such as a router, may create a hardware bridge between two networks. Additionally, a remote device, such as a device on a remote network, for example, may communicate with a local network by executing a virtual private network (VPN), typically by executing a software program. In this context (e.g., throughout this document), the term "remote" or similar terms refer to the device not being a part of a particular network and the term "local" or similar terms refer to a collection of devices, for example, that are part of that network.

One challenge with networking relates to quality of service. Typically, without explicit internet traffic engineering, it may be challenge to achieve certain levels of service consistently, such as, a particular latency, a particular throughput (e.g., bandwidth) and/or a particular utilization, as examples.

BRIEF DESCRIPTION OF THE DRAWINGS

Claimed subject matter is particularly pointed out and/or distinctly claimed in the concluding portion of the specification. However, both as to organization and/or method of operation, together with objects, features, and/or advantages thereof, claimed subject matter may be understood by reference to the following detailed description if read with the accompanying drawings in which:

Figure 1:
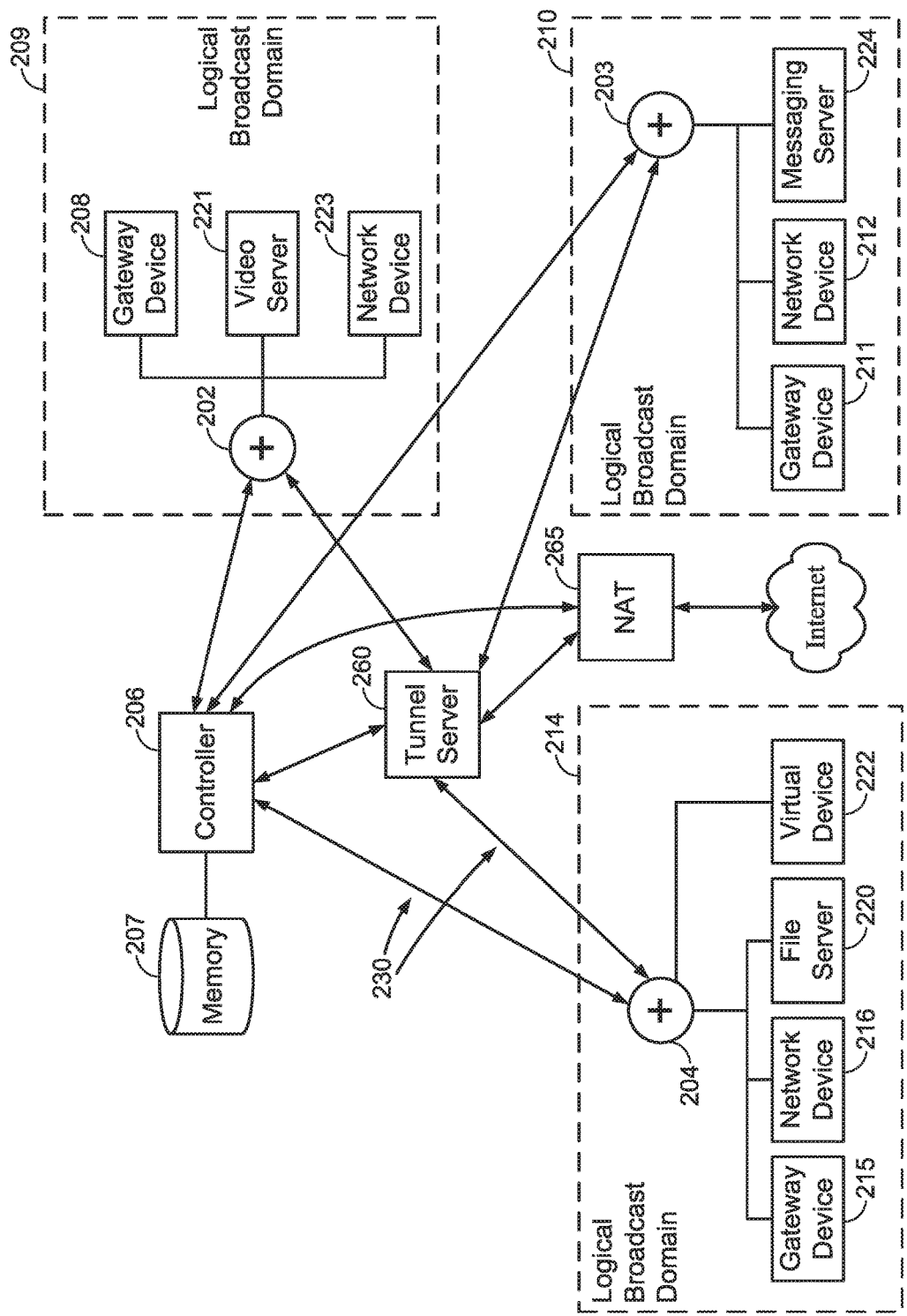
FIG. 1 is a schematic diagram illustrating an embodiment.

Reference is made in the following detailed description to accompanying drawings, which form a part hereof, wherein like numerals may designate like parts throughout to indicate corresponding and/or analogous components, for example. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or similar references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

In the following detailed description, numerous specific details are set forth to provide a thorough understanding of claimed subject matter. For purposes of explanation, specific numbers, systems and/or configurations are set forth, for example. However, it should be apparent to one skilled in the relevant art having benefit of this disclosure that claimed subject matter may be practiced without specific details. In other instances, well-known features may be omitted and/or simplified so as not to obscure claimed subject matter. While certain features have been illustrated and/or described herein, many modifications, substitutions, changes and/or equivalents may occur to those skilled in the art. It is, therefore, to be understood that appended claims are intended to cover any and all modifications and/or changes as fall within claimed subject matter.

Reference throughout this specification to one implementation, an implementation, one embodiment, an embodiment and/or the like may mean that a particular feature, structure, and/or characteristic described in connection with a particular implementation and/or embodiment may be included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described may be combined in various ways in one or more implementations. In general, of course, these and other issues may vary with context. Therefore, particular context of description and/or usage may provide helpful guidance regarding inferences to be drawn.

Operations and/or processing, such as in association with networks, such as communication networks, for example, may involve physical manipulations of physical quantities. Typically, although not necessarily, these quantities may take the form of electrical and/or magnetic signals capable of, for example, being stored, transferred, combined, processed, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and/or similar terms are to be associated with appropriate physical quantities and are intended to merely be convenient labels.

Likewise, in this context, the terms "coupled", "connected," and/or similar terms may be used generically. It should be understood that these terms are not intended as synonyms. Rather, "connected" if used generically may be used to indicate that two or more components, for example, are in direct physical and/or electrical contact; while, "coupled" if used generically may mean that two or more components are in direct physical or electrical contact; however, "coupled" if used generically may also mean that two or more components are not in direct contact, but may nonetheless co-operate or interact. The term coupled may also be understood generically to mean indirectly connected, for example, in an appropriate context.

The terms, "and", "or", "and/or" and/or similar terms, as used herein, may include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms may be used to describe any feature, structure, and/or characteristic in the singular and/or may be used to describe a plurality or some other combination of features, structures and/or characteristics. Though, it should be noted that this is merely an illustrative example and claimed subject matter is not limited to this example. Again, particular context of description and/or usage may provide helpful guidance regarding inferences to be drawn.

It should be understood that for ease of description a network device (also referred to as a networking device) may be embodied and/or described in terms of a computing device. However, it should further be understood that this description should in no way be construed that claimed subject matter is limited to one embodiment, such as a computing device or a network device, and, instead, may be embodied as a variety of devices or combinations thereof, including, for example, one or more illustrative examples.

In this context, the term network device refers to any device capable of communicating via and/or as part of a network. While network devices may be capable of sending and/or receiving signals (e.g., signal packets), such as via a wired or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, integrated devices combining two or more features of the foregoing devices, the like or any combination thereof.

A network may comprise two or more network devices and/or may couple network devices so that signal communications, such as in the form of signal packets, for example, may be exchanged, such as between a server and a client device and/or other types of devices, including between wireless devices coupled via a wireless network, for example.

A network may also include now known, or to be later developed arrangements, derivatives, and/or improvements, including, for example, past, present and/or future mass storage, such as network attached storage (NAS), a storage area network (SAN), and/or other forms of computer and/or machine readable media, for example. A network may include the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures or may be compliant and/or compatible with differing protocols, such as communication protocols (e.g., network communication protocols), may interoperate within a larger network. In this context, the term sub-network refers to a portion or part of a network. Various types of devices, such as network devices and/or computing devices, may be made available so that device interoperability is enabled and/or, in at least some instances, may be transparent to the devices. In this context, the term transparent refers to devices, such as network devices and/or computing devices, communicating via a network in which the devices are able to communicate via intermediate devices, but without the communicating devices necessarily specifying one or more intermediate devices and/or may include communicating as if intermediate devices are not necessarily involved in communication transmissions. For example, a router may provide a link or connection between otherwise separate and/or independent LANs. In this context, a private network refers to a particular, limited set of network devices able to communicate with other network devices in the particular, limited set, such as via signal packet transmissions, for example, without a need for re-routing and/or redirecting such network communications. A private network may comprise a stand-alone network; however, a private network may also comprise a subset of a larger network, such as, for example, without limitation, the Internet. Thus, for example, a private network "in the cloud" may refer to a private network that comprises a subset of the Internet, for example. Although signal packet transmissions may employ intermediate devices to exchange signal packet transmissions, those intermediate devices may not necessarily be included in the private network by not being a source or destination for one or more signal packet transmissions, for example. As another example, a logical broadcast domain, explained in more detail herein, may comprise an example of a private network. It is understood in this context that a private network may provide outgoing network communications to devices not in the private network, but such devices outside the private network may not direct inbound network communications to devices included in the private network.

The Internet refers to a decentralized global network of interoperable networks that comply with the Internet Protocol (IP). It is noted that there are several versions of the Internet Protocol. Here, the term Internet Protocol or IP is intended to refer to any version, now known or later developed. The Internet includes local area networks (LANs), wide area networks (WANs), wireless networks, and/or long haul public networks that, for example, may allow signal packets to be communicated between LANs. The term world wide web (WWW) and/or similar terms may also be used, although it refers to a sub-portion of the Internet that complies with the Hypertext Transfer Protocol or HTTP. It is noted that there are several versions of the Hypertext Transfer Protocol. Here, the term Hypertext Transfer Protocol or HTTP is intended to refer to any version, now known or later developed. It is likewise noted that in various places in this document substitution of the term Internet with the term world wide web may be made without a significant departure in meaning and may, therefore, not be inappropriate in that the statement would remain correct with such a substitution.

Signal packets, also referred to as signal packet transmissions, may be communicated between nodes of a network, where a node may comprise one or more network devices and/or one or more computing devices, for example. As an illustrative example, but without limitation, a node may comprise one or more sites employing a local network address. Likewise, a device, such as a network device and/or a computing device, may be associated with that node. A signal packet may, for example, be communicated via a communication channel or a communication path comprising the Internet, from a site via an access node coupled to the Internet. Likewise, a signal packet may be forwarded via network nodes to a target site coupled to a local network, for example. A signal packet communicated via the Internet, for example, may be routed via a path comprising one or more gateways, servers, etc. that may, for example, route a signal packet in accordance with a target address and availability of a network path of network nodes to a target address. Although the Internet comprises a network of interoperable networks, not all of those interoperable networks are necessarily available or accessible to the public.

Although physically connecting a network via a hardware bridge is done, there may be one or more drawbacks. A hardware bridge may not typically include a capability of interoperability via higher levels of a network communications protocol. A network communications protocol refers to a set of signaling conventions for communications between or among devices in a network, typically network devices; for example, devices that substantially comply with the protocol or that are substantially compatible with the protocol. In this context, the term "between" and/or similar terms are understood to include "among" if appropriate for the particular usage. Likewise, in this context, the terms "compatible with", "comply with" and/or similar terms are understood to include substantial compliance and/or substantial compatibility.

Typically, a network communications protocol has several layers. These layers may be referred to here as a network communication stack. Various types of network communications may occur across various layers. For example, as one moves higher in a network communication stack, additional operations may be available by transmitting network communications that are compatible and/or compliant with a particular network communications protocol at these higher layers. Therefore, for example, a hardware bridge may be unable to forward signal packets since it may operate at a layer of a network communication stack that does not provide that capability. Although higher layers of a network communications protocol may, for example, affect device communication permissions, user communication permissions, etc., a hardware bridge, for example, may typically provide little user control, such as for higher layer operations. Furthermore, making changes at a hardware layer may potentially affect performance of network communications, such as for one or more layers, for example. Another drawback, as mentioned previously, is that it may be difficult, time consuming and/or expensive to setup and/or modify features of a hardware bridge without specialized skills and/or experience, such as technical know-how.

A VPN, such as previously described, may enable a remote device to communicate via a local network, but may also have drawbacks. A router may allow network communications in the form of network transmissions (e.g., signal packets), for example, to occur from a remote device to a VPN server on a local network. A remote device may be authenticated and a VPN server, for example, may create a special route between a local network and the remote device through an intervening router. However, a route may be generated and/or also regenerate if the remote device is power cycled, for example. Also, a VPN typically may affect a single remote device, which may be limiting, for example, in some situations. Similarly, here too, as mentioned previously, it may be difficult, time consuming and/or expensive to setup and/or modify features of a VPN without specialized skills and/or experience, such as technical know-how.

A network may be very large, such as comprising thousands of nodes, millions of nodes, billions of nodes, or more, as examples. As the number of network devices communicating via a network grow, signals transmissions via a network, such as in the form of signal packets, for example, may begin to interfere. Thus, it may be desirable to create and/or generate a logical, private network, such as via (e.g., over) the Internet, to potentially limit the number of signal transmissions at least partially without necessarily limiting geographies, for example, by having portions of a logical, connected, secure private network in geographies of potential interest. In addition, it may be possible to purchase available capacity, such as memory and/or processing capacity of a third party, as examples, in separate markets, such as markets where costs may be more appealing, providing another potential benefit, as explained in more detail later. For example, applications, such as software applications, may execute above or on infrastructure, such as networking infrastructure and/or computing infrastructure, in a manner to provide capabilities, such as these as well as others. Thus, for example, one or more software applications may execute on computing and/or memory resources owned by a third party to create and/or generate a logical, private network for an entity other than the third party that owns the computing and/or memory resources, as explained in more detail later. In this context, networking infrastructure refers to conventional hardware and software that is deployed or deployable to provide networking functionality and/or network services without using or including components substantially in accordance with claimed subject. Likewise, in this context, computing infrastructure refers to conventional hardware and software that is deployed or deployable to provide computing functionality and/or services without using or including components substantially in accordance with claimed subject matter.

In this context, the terms cloud, cloud computing, cloud hosting and/or similar terms refers to is the use of network and/or computing resources (e.g., hardware), network and/or computing applications (e.g., software), or any combinations thereof delivered as a service over a network (typically the Internet), meaning here, in essence, the use of hardware and/or software owned by one or more third parties. A benefit of use of the cloud or cloud computing is that it permits someone, such as an entity, (e.g., a network provider, for example) to offer a product and/or service without necessarily owning the hardware and/or software, or at least large portions thereof. Thus, for example, a third party handles obtaining power, purchasing equipment, renting space, obtaining connectivity, etc., etc. An example, but not the only one, includes Amazon AWS, which, for example, owns and/or provides data centers with equipment, etc., it makes available to others, as described.

Although a router may link otherwise independent LANs through routing of signal packets, a router may also provide some limits on signal packet transmissions to a select set of devices, such as network devices and/or computing devices, for example. A router may limit signal packet transmissions via implicitly or explicitly producing a broadcast domain (also referred to as BD or as a broadcast domain). In this context, the term broadcast domain refers to a set of devices, such as network devices and/or computing devices, including associated services and/or support, occupying a network address space, such as a local network address space, in which any device is able to communicate with any other device in the broadcast domain without rerouting a transmission, such as a signal packet, for example. Although claimed subject matter is not necessarily limited in scope in this respect, additional example embodiments of a broadcast domain (along with related technology) may be discussed in U.S. patent application Ser. No. 13/543,729, titled "COMMUNICATION BETWEEN BROADCAST DOMAINS," filed on Jul. 6, 2012, by Hankins et al., herein incorporated by reference in its entirety and assigned to the assignee of currently claimed subject matter. For example, a signal packet may be transmitted to other devices in a broadcast domain without being directed or redirected via a router or similar device, such as a device capable of affecting routing of signal packets, for example. Using a router or a similar device able to perform network address translation, portions of networks may be logically separate and independent such that transmissions in the form of signal packets transmitted by a network device on a network, for example, may not necessarily be forwarded from the BD unless a destination having a particular destination address of a signal packet transmission exists outside the particular broadcast domain. In this context, a device capable of performing network address translation is referred to generically as a NAT device or a NAT. The foregoing effectively illustrates one example of logically independent and separate (e.g., non-overlapping) divisions of a network, in which the divisions may comprise examples of respective broadcast domains.

Examples of broadcast domains may include logical BDs, virtual BDs, physical BDs or non-virtual BDs. For example, in this context, a physical BD refers to a traditional BD comprising a set of physical devices, in which a physical device is able to communicate with another physical device in the broadcast domain, e.g., as previously explained, without being rerouted. For example, a signal packet may be transmitted from one device in the BD to another device in the BD without being directed or redirected via a router or similar device, such as a device capable of affecting routing of signal packets, for example. In contrast, a virtual BD refers to a BD that includes at least some virtual components within the BD, such as a virtual device, and/or to a BD in which physical devices are linked, such as via a tunnel server, for example, as explained in more detail later. If used in a networking context, rather than generically, the terms linked and/or connected, such as, for example, if used to refer to devices in separate BDs, such as network devices and/or computing devices, refers to allowing signal packets to communicate between broadcast domains as if the broadcast domains are not separate, but without substantially changing the broadcast domain configuration of the separate broadcast domains. Again, although claimed subject matter is not necessarily limited in scope in this respect, additional example embodiments (along with related technology) may be discussed in aforementioned U.S. patent application Ser. No. 13/543,729. The terms connected, linked, logically joined and/or similar terms may be used interchangeably in context, such as in a networking context. Likewise, in this context, a virtual broadcast domain may refer to a broadcast domain generated and/or created by linking two or more broadcast domains at least for a period of time. A virtual BD operates like (e.g., similar to) a physical BD, however, a virtual device that may be part of a BD (e.g., a virtual BD), for example, is not necessarily associated with the same particular physical devices at all times. For example, a virtual device in a virtual BD, may move from one physical device to a different physical device, as a simple example, and remain in the BD where, for example, state of the device, although virtual, is maintained. Thus, while a virtual device in the BD necessarily executes on a physical device, it does not necessarily always execute on the same physical device at all times.

A broadcast domain may also be referred to as a logical broadcast domain (also referred to as LBD). A logical broadcast domain may comprise a virtual broadcast domain and/or a physical broadcast domain. A logical broadcast domain that includes a virtual broadcast domain, for example, may refer to a logical broadcast domain in which spatial confines, so to speak, of at least portions of the broadcast domain may not be entirely related to a particular set of physical devices. For example, some devices in the BD may not be consistently limited or associated with any particular physical devices. Some devices of the broadcast domain, for example, may be logically independent of physical devices, as alluded to above in connection with discussion of a virtual BD.

Along similar lines, a virtual local area network (VLAN) may, for example, comprise a logical partition or sub-partition of an otherwise physical LAN and/or logically joined (e.g., linked) logical partitions or logical sub-partitions of multiple physical LANs, for example. Likewise, a virtual network may comprise a similar concept in which logical partitions or sub-partitions of LANs, VLANs or virtual broadcast domains, may, for example, in an embodiment, be logically joined (e.g., linked) at least for a period of time. A non-virtual broadcast domain simply is another way to refer to a physical BD since it refers to a broadcast domain in which the broadcast domain devices exclude any virtual devices. Thus, devices in a non-virtual BD may comprise physical devices, such as a router, a computing platform (that includes a computing device, for example), a network device, etc. The term broadcast domain is also used in a generic sense meaning that it is not limited exclusively to a broadcast type of signal packet transmission scheme and/or may include in addition to and/or in place of a broadcast, other types of signal packet transmission schemes, such as, but not limited to, anycast, broadcast, multicast, unicast, geocast, the like, or any combinations thereof.

A network device comprises a device capable of communicating via a network, as mentioned. A computing device comprises a device capable of executing computations. Thus, for example, network devices may comprise computing devices, non-computing devices, and/or other devices. A network device may comprise, as non-limiting examples, a router, gateway, hub, switch, host, mobile device, server, client, NAT device, the like, or any combinations thereof. A server, which may comprise a computing device, may also operate as network device, by serving content over a network. For example, a server may provide now known and/or to be later developed, service arrangements, derivatives, and/or improvements, including past, present, and/or future services comprising, but not limited to, web services, third-party services, audio services, video services, email services, instant messaging (IM) services, SMS services, MMS services, voice over IP (VOIP) services, calendaring services, photo services, database services, facsimile services, file services, domain name services, game services, printing services, proxy services, data streaming services, peer-to-peer services, other services, the like or any combinations thereof. Examples of content may include text, images, audio, video, the like, or any combinations thereof, which may be processed in the form of physical signals, such as electrical signals, for example, or may be stored in memory, as physical states, for example.

As indicated above, a logical broadcast domain refers to at least a logical division of a network comprising a plurality of network devices such that network devices communicating via the logical division of the network may communicate with other network devices communicating via the logical division without use of a router or other network device capable of limiting network communications and/or rerouting signal packet transmissions. For example, as a non-limiting illustration, a single logical broadcast domain may be constructed using multiple repeaters, hubs, NAT devices, and/or switches, whereby a network device communicating via one of the multiple repeaters, hubs, NAT devices or switches may communicate with another network device communicating via one of the repeaters, hubs, NAT devices and/or switches.

In one example illustrative embodiment, use of a discovery device and a reflecting device, may allow network devices communicating via their respective broadcast domains, for example, to discover and request services available via other network devices while still communicating via remote broadcast domains and potentially with less complexity, traffic and/or expense than conventional routing. In one possible illustrative embodiment, a controller may manage a plurality of respective discovery and reflecting devices communicating via their respective broadcast domains. In still another possible embodiment, a controller may provision one or more tunnel servers, for example, to facilitate communications between network devices communicating as part of different broadcast domains. Likewise, in still another illustrative embodiment, a controller may comprise a master controller that may be used to manage other controllers, for example, although there may, of course, be more than one or even several master controllers in a particular embodiment. In one or more embodiment, operations may be performed, for example, by software implemented applications that may be executing on or above a software stack of a device, such as a network device and/or a computing device; of course, this is not necessarily required, but it may be typical in some embodiments.

For example, in an embodiment, a discovery device may comprise a network device capable of communicating as part of a broadcast domain to discover features of the particular broadcast domain without human intervention to generate a broadcast domain configuration of the particular broadcast domain. A discovery device may engage in a variety of activities to accomplish this including, but not limited to any of the following: passively monitoring signal packets, actively probing other network devices, port scanning other network devices, querying other network devices, querying servers, such as a domain controller or other server responsible for a directory of broadcast domain features, any combinations thereof, or other approaches. In this context, as mentioned, without human intervention indicates that processes may be executed without human intelligence being on hand or otherwise available to make appropriate adaptations or changes, such as, if unanticipated events take place, for example. One or more processes may execute satisfactorily to accomplish a particular result, for example, without such human intelligence, interaction or direction. Thus, in a sense, processes may be performed automatically, so to speak. As previously mentioned, in one or more embodiments, operations may be performed, for example, by software implemented applications that may be executing on or above a software stack of a device, such as a network device and/or a computing device; of course, this is not necessarily required, but it may be typical in some embodiments.

Industry software applications may also assist in generating a broadcast domain configuration. For example, Nmap, a GNU software program, written by Gordon Lyon (also known by his pseudonym Fyodor Vaskovich) and available for download, for example, at the website www.nmap.org, comprises network scanner software capable of discovering hosts and/or services on a broadcast domain. Nmap may be executed by a computing or a network device to send network transmissions in the form of signal packets to hosts on a broadcast domain and may evaluate received response packets. Nmap is at least capable of discovering a host operating system, names and versions of available services, estimated uptime, hardware parameters and/or other network parameters. A discovery device, for example, may discover a broadcast domain configuration parameter using Nmap or any other software application capable of similar discovery. Thus, a software implemented application to perform discovery, for example, may execute above or on other software of a software stack executing on a device, such as a computing device and/or a network device, for example. As an example, a virtual device may be executing discovery. Likewise, as previously indicated, in an embodiment, the virtual device may be executing on a physical device owned by a third party, for example; although, again, not necessarily.

Thus, in an example embodiment, a broadcast domain configuration may be generated by a discovery device monitoring discovery signal packets via a broadcast domain. A discovery device in an embodiment, as indicated, may comprise a network device and/or a computing device executing an appropriate software application. A discovery device may also passively monitor signal packets that may comprise information relative to a broadcast domain configuration. A discovery device may also actively probe one or more devices, such as communicating as part of a broadcast domain or addressable via a broadcast domain. For example, a discovery device may port scan another device communicating as part of a broadcast domain, or use a software application capable of accomplishing such a task, for example. In this context, a domain controller refers to a network device that is capable of responding to security authentication requests on a broadcast domain. A discovery device may request broadcast domain configuration parameters from an active directory server or other network device capable of maintaining a directory of broadcast domain configuration parameters. For example, a domain controller may comprise an active directory server, and a discovery device may query an active directory server by transmitting signal packets requesting a response comprising discovery signal information. Again, as indicated, a software implemented application, for example, may perform operations in an embodiment.

Likewise, in another embodiment, available services via a network device may be determined based at least in part on which ports are open on a network device. Port scanning a network device may determine which ports may be open by transmitting signal packets to request a connection with a network device on a port. A network device may respond, for example, by transmitting signal packets indicating an available connection. See, for example, RFC 793—Transmission Control Protocol, available, for example, from the Internet Engineering Task Force (IETF), at www.ietf.org. Signal packets comprising responses may imply that a port may be available.

Because network port numbers may consistently map to known services, a network device monitoring these responses may at least in part discover which services may be available via other network devices. For example, an open port 20 or 21 may imply that an FTP service may be available. Additionally, SSH may be available via port 22, Telnet may be available via port 23, SMTP may be available via port 25, POP3 may be available via port 110, or HTTPS may be available via port 443, for example. As is known in the art, associations between port numbers and services may be consistent, or may change over time. As associations between port numbers and services evolve, it is intended that claimed subject matter include discovery of available services according to evolving industry standards. As in known in the art, port scanning may be accomplished via TCP scanning, SYN scanning, UDP scanning, ACK scanning, Window scanning, FIN scanning, or other scanning types or methods, as may be known in the art or may later be developed.

In another illustrative embodiment, a reflecting device may comprise a network device capable of communicating as part a broadcast domain and capable of emulating a generated (e.g., other) broadcast domain configuration without human intervention. As previously mentioned in connection with discussion of a discovery device, in one or more embodiments, operations of a reflecting device may be performed, for example, by software implemented applications that may be executing on or above a software stack of a device, such as a network device and/or a computing device; of course, this is not necessarily required, but it may be typical in some embodiments. In this context, the term emulate refers to software stored or capable of executing on a physical device in which, the software, if executed by a physical device, for example, would appear to another network device as a device other than the physical device that is executing the software. Emulation may include operating as a proxy, meaning to appear as another device that may exist or it may include appearing as a device that does not exist anywhere. Likewise, emulation may include appearing as an enhanced or augmented version of another device or as a more limited version of another device. Furthermore, the term device, unless specified to be a physical device may include a virtual device or an emulated device.

In an embodiment, emulation may comprise, for example, a first network device simulating another network device via a broadcast domain. Another network device, in this example, may comprise a physical network device, or a virtual network device. Therefore, the emulated device may not exist as a physical piece of hardware. The emulating device may, however, make services available via a broadcast domain by transmitting signal packets in which, for example, requests for services may be forwarded to the emulated device to perform advertised services, for example, if the emulated device comprises a physical device. In another embodiment, an emulating device may offer services via a broadcast domain without forwarding requests to another network device. Additionally, emulation, in an embodiment, may comprise imitating another network device. However, another network device may exist virtually, and/or may comprise a set instructions being executed via another network device and/or computing device. Although services may appear to be available via a device, the device may, therefore, in an embodiment, comprise a virtual device. For example, a software application may execute instructions such as a virtual device on or above a software stack of a physical device.

In a possible example embodiment, a reflecting device may receive signal packets from a discovery device communicating via a remote broadcast domain, which may comprise a broadcast domain configuration including features of a broadcast domain, such as those disclosed below, for example. A reflecting device may forward signal packets via a local broadcast domain in a manner so as to emulate a generated broadcast domain configuration.

In this context, the term logical broadcast domain configuration refers to various hardware devices, firmware, and/or software applications (if residing in one or more locations within a LBD so as to be capable of being accessed or executed electronically, such as via a computing device) supporting a logical broadcast domain. As used in this specification, a logical broadcast domain configuration, therefore, may include stored signal packets relating to one or more features of a logical broadcast domain. For example, a configuration may represent, characterize and/or specify information, although in physical form, such as signals, related to one or more features, and/or other stored information, again, in physical form, such as memory states, relating to one or more features of a network device communicating via the logical broadcast domain, such as to represent, characterize and/or specify the one or more features of the LBD. Although claimed subject matter is not necessarily limited in scope in this respect, additional example embodiments of a broadcast domain configuration (along with related technology) may be discussed in aforementioned U.S. patent application Ser. No. 13/543,729.

For example, a broadcast domain configuration may include a subset of, and/or additions to the following non-limiting illustrative examples of features: one or more network protocols, available addresses, used addresses, topologies, devices used, such as switches or hubs, historical settings, such as for security, for a network protocol, etc., modifications of the foregoing, user accounts, including status, authentication, etc., security settings of a broadcast domain, workgroup or domain names, device names including status, available device features, etc., services available and/or used, status of the network devices, as well as other features.

In one example illustrative embodiment, use of a network device, for example, may allow network devices communicating via their respective logical broadcast domains, for example, to discover and/or request services available via network devices of another logical broadcast domain while still communicating via their respective logical broadcast domains, potentially at least partially with less complexity, traffic and/or expense than conventional routing. In this context, the term gateway device may also be employed to refer to a network device able to link logical broadcast domains via a tunnel server. As a matter of convenience, however, it is understood that any network device may include such a capability, such as, for example, if loaded with software providing an appropriate capability, as described in more detail throughout this specification. Therefore, it is not intended that the term gateway be used in this document to exclusively refer to devices having such capability. Likewise, in this context, the term linking logical broadcast domains refers to allowing signal packets to communicate between logically separate broadcast domains as if the logical broadcast domains are not separate, but without substantially changing the broadcast domain configuration of the separate, logical broadcast domains. As mentioned, the terms connected, linked, logically joined and/or similar terms are used interchangeably in context, such as in a networking context (as opposed to generically). Likewise, in this context, a virtual broadcast domain may be generated and/or created by linking logical broadcast domains at least for a period of time. It is also noted that in an embodiment or implementation, a logical broadcast domain may comprise a single and/or remote stand-alone device.

Thus, in one embodiment, devices communicating as part of a virtual broadcast domain, may communicate with devices operating as part of a non-virtual broadcast domain, respectively, for example. In one illustrative embodiment, this may be accomplished via use of a tunnel server linking several network devices, for example. A tunnel server may, for example, execute software capable of receiving and/or sending signal packets from network devices in different logical broadcast domains. Different logical broadcast domains may otherwise use separate routers, for example. Typically, therefore, different logical broadcast domains may occupy separate network address spaces, such as separate IP address spaces, as an example. Also, typically, routers may provide network address translation so that signal packets may be properly routed after leaving a particular logical broadcast domain. However, if, for example, separate routers for respective BDs include a routing table, or similar mechanism, such that signal packets intended to reach another logical broadcast domain are routed to a tunnel server, in this example embodiment, as a result, network address translation may be by-passed. Network devices in separate logical broadcast domains may, therefore, communicate with and/or via a tunnel server. A tunnel server may forward traffic (e.g., signal packet transmissions) between gateway devices, for example, such as for communications between different logical broadcast domains. Although claimed subject matter is not necessarily limited in scope in this respect, additional example embodiments of a tunnel server (along with related technology) may be discussed in U.S. patent application Ser. No. 13/675,552, titled "LINKING LOGICAL BROADCAST DOMAINS," filed on Nov. 13, 2012, by Hankins et al., herein incorporated by reference in its entirety and assigned to the assignee of currently claimed subject matter.

Thus, for example, if a virtual broadcast domain provides a signal packet A to a tunnel server, it may be encapsulated. Likewise, if a non-virtual broadcast domain provides a signal packet B to a tunnel server it may be encapsulated. However, in this embodiment, a tunnel server may likewise remove encapsulation (e.g., referred to as termination) to determine where to forward a signal packet and re-encapsulate it for forwarding. It is noted that the encapsulation is a term of art, but may take a variety of forms. Claimed subject matter is not intended to be limited to a particular form of encapsulation. Likewise, in an embodiment, as a few non-limiting illustrative examples, encapsulation may include encryption as well, and/or may separate encapsulation from termination. Of course, use of gateway devices, network devices and/or tunnel servers may involve much more complex network transmission and/or routing arrangements as well. The previous description is simplified for purposes of illustration and, therefore, is not intended to be limiting.

In one possible illustrative embodiment, a controller may manage a plurality of respective gateway devices communicating via their respective logical broadcast domains. In still another possible embodiment, a controller may provision one or more tunnel servers, for example, to facilitate communications between network devices communicating as part of different, respective logical broadcast domains (e.g., gateways in respective LBDs may communicate via a tunnel server). Likewise, in still another illustrative embodiment, a controller may comprise a master controller that may be used to manage other controllers, for example, although there may, of course, be more than one or even several master controllers, as well as several private networks, in a particular embodiment. As shall become clear later, in an embodiment, although subject matter is not limited in scope in this respect, use of a controller may provide a capability for centralized management of a private network, for example. In an embodiment, for example, this may at least partially, for example, include one or more software implemented applications.

The term tunnel server refers to a mechanism or technique capable of being implemented in a network, such as in software, firmware, hardware or any combination thereof (other than software per se, since software is executed, of course, typically on one or more computing devices), that includes a capability to link logical broadcast domains, such as via encapsulation of signal packets, as previously described, for example. For example, a tunnel server may comprise a software application initiated by a controller, but potentially executed elsewhere, such as on a separate server. Throughout this document the term software application and/or software implemented application is understood to also encompass more than one software application and/or more than one software implemented application. For example, in an embodiment, a tunnel server may be implemented as a virtual device executing on one or more servers owned by one or more third parties; although claimed subject matter is not limited in scope in this respect. Furthermore, in another embodiment, a tunnel server may comprise a network device physically, logically, virtually or non-virtually separate from a controller. Likewise, a tunnel server may execute additional services. For example, in an embodiment, a tunnel service may also include a capability to implement a private network policy and inspection. In this context, the term private network policy and inspection refers to a capability to implement a unified networking policy, despite potentially being physically or logically separate networks and/or physically or logically separate sub-networks, for example. Furthermore, implementing a private network policy and inspection includes a capability for selected networks and/or sub-networks to implement selected policies or for selected networks and/or sub-networks to implement or employ a unified policy. Selected networking policies or a unified networking policy may, for example, include particulars regarding implementing at least one of the following processes: virus scanning, authentication, filtering (including URL filtering, for example), deep packet inspection, encryption, a firewall, or any combinations thereof.

Additionally, a tunnel server may, in an embodiment, be employed to provide a virtual and/or online presence that may be employed to deploy network services, resources and/or applications, referred to here as network-related features. It is, of course, however, appreciated that claimed subject matter is not limited to creating a virtual and/or online presence for deployment of network-related features to a private network via a tunnel server. Other approaches are possible and are intend to be included within claimed subject matter. Nonetheless, continuing with this embodiment example, as mentioned, a tunnel server, for example, may be employed to monitor and/or measure network traffic. To do so may involve, for example, termination of signal packet encapsulation. After termination of encapsulation, subsequent re-encapsulation may then permit a signal packet to continue to traverse a private network in an embodiment. A process of termination of encapsulation and re-encapsulation may in this context be termed a private network "hop." Implementation of a private network "hop," in an embodiment, provides, in addition to centralized management of a private network, as previously mentioned, a capability to generate or provide a mechanism for deployment of network-related features. Thus, a private network provider, such as Pertino, Inc., for example, in effect, may become a virtual member of every private network that it provides or generates for its users, if desired. As a network member, Pertino, therefore, it able to deploy network-related features largely on demand, in a seamless, turnkey fashion, with little technical know-how needed by the user, in a manner that is dynamic, configurable and/or reconfigurable in real-time, potentially global in scope, scalable, without ownership of hardware, as well as other potential benefits, as described in more detail later. Of course, claimed subject matter is not limited in scope to any particular advantage since it may be dependent on the particular embodiment. Although claimed subject matter is not necessarily limited in scope in this respect, additional example embodiments may be discussed in U.S. patent application Ser. No. 15/239,138, titled "DEPLOYMENT OF NETWORK-RELATED FEATURES OVER CLOUD NETWORK," filed on Mar. 14, 2013, by Hankins et al., herein incorporated by reference in its entirety and assigned to the assignee of currently claimed subject matter.

Of course, deployment of network-related features may depend at least in part on details of a feature. For example, "in line" type services, such as deep packet inspection and/or virus protection, as discussed, may relate to a private network "hop," for example. Likewise, addition (or removal) of infrastructure, such as adding memory, adding an exchange server or even adding a virtual device, may be accomplished via a logical broadcast domain, along with an associate logical broadcast domain configuration. For example, without limit, after a user request, a controller may initiate provisioning and/or deployment. Along similar lines, services related to generating reports of private network related activity, for example, may be accomplished via a management device, which may or may not be included in a private network, as described, for example, in previously referenced US patent application U.S. patent application Ser. No. 14/763,805. For example, a user request may result in a controller query of a database, which may be local or otherwise accessible. Likewise, some network-related features may be deployed using one or more controllers, one or more tunnel servers, one or more gateway devices of one or more logical broadcast domains, one or more logical broadcast domain configurations, querying one or more databases, or any combinations thereof. For example, a geo location feature, as one example, may employ some combination of components.

Likewise, in an embodiment, a gateway device may comprise a network device capable of communicating as part of a broadcast domain to discover features of another broadcast domain without human intervention, such as, for example, to generate a broadcast domain configuration of another broadcast domain. Although claimed subject matter is not necessarily limited in scope in this respect, additional example embodiments of a broadcast domain configuration (along with related technology) may be discussed in aforementioned U.S. patent application Ser. No. 13/543,729. As described previously, the term gateway device is introduced as a matter of convenience; it is intended that within this specification any network device may include such a capability, such as via one or more software implemented applications, for example. For example, a network device may engage in a variety of activities to accomplish this including, but not limited, to any of the following: passively monitoring signal packets, actively probing other network devices, port scanning other network devices, querying other network devices, querying servers, such as a domain controller and/or other server responsible for a directory of broadcast domain features, any combinations thereof, or even other approaches. Thus, although a gateway device may be referred to as a matter of convenience in connection with a broadcast domain, for example, it is to be understood, of course, that a gateway device is provided as merely one illustration of a network device, such as a network device with capability to perform operations, as described, for example, such as, discovery, reflection, communication with a tunnel server, operating as a tunnel server, operating as a controller, etc. Likewise, a network device may be implemented virtually (e.g., logically) or non-virtually (e.g., physically). Furthermore, in this context, without human intervention indicates that processes may be executed without human intelligence being on hand or otherwise generally available to make appropriate adaptations or changes, such as, if unanticipated events take place, for example. Throughout this specification, unless otherwise stated, it is intended that a process or processes be interpreted as being executed without human intervention. Thus, one or more processes may execute satisfactorily to accomplish a particular result, without human intelligence, interaction and/or direction, for example. Thus, in a sense, such processes at least may be said to be performed automatically. Typically, although not necessarily, this may include one or more software implemented applications.

As previously described, in an embodiment, for example, a controller may provide a capability of centralized management of a private network, such as a network comprising at least two logical broadcast domains, for example. Likewise, centralized management also provides a capability to virtually deploy or provision network services, resources and/or applications, referred to here as network-related features, as alluded to previously and explained in more detail later. As suggested, although claimed subject matter is not necessarily limited in this respect, in an embodiment, for example, a controller may be implemented via a server that may be associated with a node on the Internet, for example. However, as also suggested previously, management of a network, such as a private network, (which may, as simply an example, comprise a communications network for a business or an entity, for example) conventionally or typically involves some depth of technical knowledge and/or experience, such as typically may reside in a company's IT department, for example. Unfortunately, however, for small businesses or the like, as non-limiting examples, such knowledge, experience and/or capability may at least in some respects be out of reach, as a result of overhead expense, for example, that may accompany maintaining such a department.

One advantage of employing approaches consistent with embodiments previously discussed and/or related subject matter may be that a communications network may be initiated, expanded, modified and/or maintained yet still realize an associated reduced cost and/or performance improvement in comparison with traditional, conventional or state of the art networking approaches. Of course, medium or large size business may also benefit from such as approach. As will be discussed, additional advantages may also be present in an embodiment.

Possible benefits depending, of course, on particulars of an embodiment may include, for example, providing essentially a "turnkey" mechanism to bring "online" a private network of potentially worldwide geographical scope with roughly little more than an amount of technical knowledge usually employed to operate a standardly available web browser on a standardly available computing device, for example, such as the amount of technical knowledge employed to participate in a social network, such as Facebook or Google+, as simply illustrative examples. Thus, in an embodiment, a private network "in the cloud" may be managed via a GUI essentially as easily as it is to "friend" someone via Facebook, for example. Furthermore, in some embodiments, for example, hardware installation or even ownership may not necessarily be involved, as alluded to previously and explained in more detail later. Likewise, as alluded to, an embodiment of a private network in accordance with claimed subject matter, for example, may be secure, seamless, scalable and provide real-time, nearly instant (e.g., on demand) service.

As alluded, embodiments, for example, may be of benefit to smaller businesses, entities or the like, that typically may not have sufficient resources to finance or maintain an IT department on even a modest scale (although, as indicated, larger businesses may likewise benefit). Likewise, as also alluded, embodiments may leverage, for example, common place technical knowledge possessed by individuals, for example, such as those who may not be technical professionals and/or may possess a passing familiarity with computing and/or network communications technology (e.g., an amount of familiarity to use conventional computing devices, such as laptops, for example, and/or to communicate with others via those devices, etc.), but little more. Of course, it is also appreciated that these are merely illustrative examples and it is not intended that claimed subject matter be limited in scope to examples provided merely for illustrative purposes.

To provide only a few non-limiting examples here, in an embodiment, simple, but also seamless management capabilities may include provisioning and/or removing network services, resources and/or applications, including the following non-limiting examples: provisioning and/or removing computing and/or memory resources, provisioning and/or removing technical services, provisioning and/or removing software applications, adding and/or removing network users, adding and/or removing network devices, structuring groups of users and/or devices, such as for merger and/or segregation for on-going business projects, etc. As suggested, in this context, in general, resources refer to physical resources, such as may be provided by hardware (e.g., additional memory and/or processing capability). Likewise, in general, applications refer to software-related applications (e.g., at least partially implemented via software). The term 'services' refers generally to provisioning a capability for use, such as via a particular private network, which may, for example, include provisioning of resources and/or applications for use.

For example, in an embodiment, to manage a private network, such as one including at least two LBDs, for example, signal packet transmissions through a network may be initiated via (e.g., from) a network device. The initiating network device, nonetheless, need not be included in the private network. Devices included in a private network, as previously discussed, refers to a particular, limited set of network devices able to communicate with other network devices in the particular, limited set, such as via signal packet transmissions, for example, without a need for re-routing and/or redirecting such communications. In contrast, however, a device not included in the private network may be capable of being employed in management of the private network, without necessarily being a device within the private network. Of course, likewise, a device within the private network may also be capable of being employed to manage the private network. Likewise, one or more third party devices, such as a virtual device executing on one or more third party servers, as an example, may be employed.

For example, in an embodiment, a network device may be associated with a node and a controller may be associated with another node. Although claimed subject matter is not limited in scope in this respect, thus, in one example, the network device and the controller may respectively be associated with separate nodes, the nodes being accessible via the Internet, as an illustration. Thus, signal packet transmissions may be initiated from a network device to a controller, for example. In this example, a controller may comprise a mechanism for centralized management of a private network, such as previously described. For example, a controller may be implemented on a server, as one example, mentioned previously. Typically, but not necessarily, a controller may exist virtually, and/or may comprise a set instructions being executed via a device, such as a network device and/or computing device. Although a controller may appear to be available, the device may, in an embodiment, comprise a virtual device. For example, a software application may execute instructions such as a virtual device on or above a software stack of a physical device.

A network device, such as described in this example, typically may include a GUI, so that rendering of the GUI may take place. Of course, any one of a host of mechanisms to accomplish this are possible. For example, a standard web browser may be employed to render a GUI. A GUI, for example, may be rendered on a network device and/or a computing device based at least in part on signal packet transmissions to the device that may be initiated by a controller, for example. Thus, a client-server model in which, for example, a controller serves content to a client may be employed to render a GUI on a network device via a conventional browser without a plug-in, for example. Alternately, a plug-in may be employed to facilitate rendering of a GUI. In still another possible embodiment, a device, such as a network device and/or computing device, may include native software to render a GUI. These, of course, are merely illustrative examples and claimed subject matter is not restricted in scope to these or any other particular approaches, now known or later developed, that may be employed to render a GUI on a device having a display, such as on a network device, for example. Although in this example, the Internet was discussed, in an alternative embodiment, of course, the network may comprise any network, such as a stand-alone private network, an Intranet, a local area network, a wide area network, etc. Thus, as alluded to previously, a device, such as a network device and/or a computing device, to manage a private network may be included within the private network, but is not necessarily so.

Likewise, in addition to management of a private network, as described in more detail and illustrated, for example, a GUI may be employed in connection with virtual deployment of network services, resources and/or applications. For example, a GUI may be rendered giving a user of a private network an ability to request provisioning and/or removal of services, resources and/or applications, such as, for example, the previously described non-limiting set of examples. Likewise, although navigating a GUI by a user involves human activity to make a selection, after a user request is provided, such as via a GUI, provisioning and/or removal of requested services, resources and/or applications may take place without further human intervention.

As suggested previously, signal packet transmissions may be initiated from a device, such as a network device and/or a computing device. Initiated signal packet transmissions may be of use at least in part in terms of management of a private network, such as one comprising at least two or more logical broadcast domains. Again, as one simple and non-limiting example, initiated signal packet transmissions may result in a controller generating a separate logical broadcast domain that includes several devices that are included in a particular private network and are accessible to a controller of that network, for example. Similarly, but alternately, initiated signal packet transmissions may result in a controller generating a separate logical broadcast domain that includes several users for a private network, where, for example, users may be accessible via devices on the private network, the devices being associated with the users.

Although the previous example referred to a single device, of course, multiple devices may respectively have GUIs with similar capabilities. Likewise, an embodiment may involve multiple private networks. Furthermore, although a network device and/or a computing device may comprise a physical device; likewise, a device may comprise a virtual device in an embodiment, such as previously indicated. Along similar lines, in a generated LBD, as discussed above, one of the devices associated with one of the users may comprise a physical device, a virtual device or a user may, for example, have both an associated physical device and another associated virtual device, as an example.

In an embodiment, a device may relationally depict or display a network, such as a private network, in terms of users on the network, rather than in terms of devices on the network. One possible advantage includes a capability to thereby manage the network in a manner more in terms of the particular trait being depicted. For example, a network may be managed or oriented with respect to users, rather than devices, which may, in some situations or environments, turn out to be more useful or desirable. It is noted that the terms depict, display or similar terms may be used interchangeably. Although claimed subject matter is not necessarily limited in scope in this respect, additional example embodiments of a broadcast domain configuration (along with related technology) may be discussed in U.S. patent application Ser. No. 14/763,805, titled "PEOPLE CENTRIC MANAGEMENT OF CLOUD NETWORKS VIA GUI", filed on Jan. 22, 2013, by Cartsonis et al., herein incorporated by reference in its entirely and assigned to the assignee of claimed subject matter. In addition, as previously suggested, another advantage in an embodiment may include a capability for a private network user, for example, to make a request that results in virtual deployment of network services, resources and/or applications.

In an example embodiment, a database, such as a relational database, may store network-related associations (e.g., traits), for example. Therefore, in an illustrative, yet simplified embodiment, a device may display a relational GUI. For example, a depiction of a network may be rendered in terms of users, for example. However, it may be desirable to see a display of geographies in which those users are located, for example. In an embodiment, manipulation of a relational GUI on a device may result in querying a relational database. Signal packet transmissions from a controller may provide query results and a relational GUI may re-render a display of a network of users in terms of geography. Again, this is merely an illustrative, yet simplified, example and it is not intended that claimed subject matter be limited to simplified, illustrative examples, of course.

An example of an embodiment of a private network, such as at least two LBDs, is discussed below. FIG. 1 is a diagram illustrating an embodiment. For example, in an embodiment, one or more networks may be overlaid on or above network connectivity via networking infrastructure and/or computing infrastructure in a manner so as to form a connected, secure private network, as mentioned previously. The one or more overlaid private networks typically are implemented via one or more software implemented applications, for example. Although claimed subject matter is not necessarily limited in scope in this respect, additional example embodiments of a broadcast domain configuration (along with related technology) may be discussed in U.S. patent application Ser. No. 14/763,805, titled "PEOPLE CENTRIC MANAGEMENT OF CLOUD NETWORKS VIA GUI", filed on Jan. 22, 2013, by Cartsonis et al., herein incorporated by reference in its entirely and assigned to the assignee of claimed subject matter.

As shall be seen, such a network may also be flexible (e.g., reconfigurable in real-time). Of course, claimed subject matter is not limited in scope to examples or illustrations, such as discussed below, for example. Rather, typically, examples or illustrations may be simplified for ease of understanding, for example. In this context, network connectivity refers to the presence of sufficient connectivity among devices of a network or sub-network to support network communications. In this context, networking infrastructure refers to conventional hardware and software that is deployed or deployable to provide networking functionality and/or network services without using or including components substantially in accordance with claimed subject. Likewise, in this context, computing infrastructure refers to conventional hardware and software that is deployed or deployable to provide computing functionality and/or services without using or including components substantially in accordance with claimed subject matter. Thus, overlaying one or more networks, such as a private network on or over connectivity via infrastructure (and/or one or more networks being overlaid on or above) refers to creating and/or generating a private address space within a network. For example, in an embodiment encapsulation may be employed in a manner so that the one or more private networks reside on or above another network that includes another network address spec, for example. In an embodiment, for an interoperable system of software applications, software implemented applications may be employed in connection with the one or more private networks, such as executing as a virtual device on a computing device and/or network device, although, of course, this is not required and is merely one example.

As suggested previously, management of a network, such as a private network, (which may, as simply an example, comprise a communications network for a business or an entity, for example) conventionally or typically involves some depth of technical knowledge and/or experience, such as typically may reside in a company's IT department, for example. Unfortunately, however, for small businesses or the like, as non-limiting examples, such knowledge, experience and/or capability may at least in some respects be out of reach, as a result of overhead expense, for example, that may accompany maintaining such a department.

One advantage of employing approaches consistent with embodiments previously discussed and/or related subject matter may be that a communications network may be initiated, expanded, modified and/or maintained yet still realize an associated reduced cost and/or performance improvement in comparison with traditional, conventional or state of the art networking approaches. Of course, medium or large size business may also benefit from such as approach. As will be discussed, additional advantages may also be present in an embodiment.

Possible benefits depending, of course, on particulars of an embodiment may include, for example, providing essentially a "turnkey" mechanism to bring "online" a private network of potentially worldwide geographical scope with roughly little more than an amount of technical knowledge usually employed to operate a standardly available web browser on a standardly available computing device, for example, such as the amount of technical knowledge employed to participate in a social network, such as Facebook or Google+, as simply illustrative examples. Thus, in an embodiment, a private network "in the cloud" may be managed via a GUI essentially as easily as it is to "friend" someone via Facebook, for example. Furthermore, in some embodiments, for example, hardware installation or even ownership may not necessarily be involved, as explained in more detail. Likewise, as alluded to, an embodiment of a private network in accordance with claimed subject matter, for example, may be secure, seamless, scalable and provide real-time, nearly instant (e.g., on demand) service.

Likewise, in an embodiment, a private network may include one or more virtual network portions. A virtual network portion, likewise, may include one or more virtual devices. Virtual devices were discussed previously. For example, a virtual device in a virtual BD, may move from one physical device to a different physical device, as a simple example, and remain in the BD where, for example, state of the device, although virtual, is maintained. Thus, while a virtual device in the BD necessarily executes on a physical device, it does not necessarily always execute on the same physical device at all times.

Furthermore, in an embodiment, the private network may comprise a dynamic network. Thus, as alluded to, the network, or a portion thereof, such as a sub-network, may be configured or re-configured in real-time. As on example, discussed in more detail later, the private network may be configured or reconfigured geographically for any one of a host of possible reasons, including to improve performance and/or reduce costs. For example, as a non-limiting illustration, a private network may be reconfigured if throughput for a route through a provisioned tunnel server begins to drop below an acceptable level. Likewise, as discussed in an example, infra., reduced proximity between gateway devices and a provisioned tunnel server may reduce latency, for example. Of course, these are merely a few illustrative examples. Many more are possible and claimed subject matter is not limited in scope to illustrations.

As mentioned, a secure, connected private network may be overlaid on or over network connectivity via networking and/or computing infrastructure. Here, as mentioned, this includes conventional networking and computing hardware and software. Likewise, it may include one or more servers owned by one or more third parties. Thus, software implemented applications may include one or more virtual devices, as mentioned above, executing on one or more servers owned by one or more third parties, for example. As alluded to previously, a virtual device may execute on or above a software stack, for example. In an embodiment, the one or more virtual devices may include one or more tunnel servers provisioned, such as by a controller, for example. Likewise, the one or more virtual devices, or other virtual devices, may include one or more controllers, such as a master controller. Furthermore, in an embodiment, a tunnel server and a controller may be combined as part of a virtual device, for example. Although claimed subject matter is not necessarily limited in scope in this respect, additional example embodiments (along with related technology) may be discussed in U.S. patent application Ser. No. 15/235,436, titled "PRIVATE NETWORKS OVERLAID ON CLOUD INFRASTRUCTURE," filed on Mar. 14, 2013, by Hankins et al., herein incorporated by reference in its entirety and assigned to the assignee of currently claimed subject matter.

Likewise, a tunnel server may perform other services, as well. For example, in an embodiment, a tunnel service may also include a capability implement a private network policy and inspection process, which may, for example, including a unified networking policy, despite potentially being physically or logically separate networks and/or physically or logically separate sub-networks, for example. A private network policy and inspection process may also include for selected networks and/or sub-networks employing selected policies or selected networks and/or sub-networks employing a unified policy. Selected networking policies or a unified networking policy may, for example, include particulars regarding implementing at least one of the following processes: virus scanning, authentication, filtering (for example, URL filtering), deep packet inspection, encryption, a firewall, or any combinations thereof, as examples. Likewise, in an embodiment, one or more tunnel servers may, for example, perform network address translation.

Additionally, a tunnel server may, in an embodiment, be employed to provide a virtual and/or online presence that may be employed to deploy network-related features, such as services, resources and/or applications. As mentioned, a tunnel server, for example, may be employed to monitor network traffic. For example, in an implementation, as discussed, a private network "hop," in an embodiment, may provide a capability to generate or provide a virtual mechanism for deployment of network-related features, along with centralized management, also previously discussed. Thus, a private network provider, such as Pertino, for example, in effect, may become a virtual member of every private network it provides or generates for its users, if desired. As a network member, Pertino, therefore, is able to deploy network-related features, largely on demand, for example, as previously discussed and as discussed in more detail later. Although claimed subject matter is not necessarily limited in scope in this respect, additional example embodiments may be discussed in U.S. patent application Ser. No. 15/239,138, titled "DEPLOYMENT OF NETWORK-RELATED FEATURES OVER CLOUD NETWORK," filed on Mar. 14, 2013, by Hankins et al., herein incorporated by reference in its entirety and assigned to the assignee of currently claimed subject matter.

As previously mentioned, a tunnel server, for example, may be employed to monitor and/or measure network traffic. To do so may involve, for example, termination of signal packet encapsulation. After termination of encapsulation, subsequent re-encapsulation may then permit a signal packet to continue to traverse a private network in an embodiment. A process of termination of encapsulation and re-encapsulation may in this context be termed a private network "hop." Implementation of a private network "hop," in an embodiment, provides, in addition to centralized management of a private network, as previously mentioned, a capability to generate or provide a mechanism for deployment of network-related features, for example, network configuration and/or reconfiguration services, network resource additions and/or reductions, and/or network application additions and/or reductions, to provide only a few out of a host of possible examples.

Although claimed subject matter is not limited in scope in this respect, virtual deploying of network-related features may comprise intercepting private network signal packet transmissions via one or more devices, such as virtual devices. Typically, although not necessarily, intercepting private network signal packet transmissions may comprise intercepting any and all private network outbound and inbound signal packet transmissions. As discussed, in an embodiment, intercepting network traffic may take place via a private network hop for private network signal packet transmissions. For example, a private network hop may be implemented in connection with a tunnel server. Likewise, of course, multiple private network hops may be employed to intercept network traffic, such as at various locations of a private network (e.g., where private network traffic is accessible).

In connection with monitoring network traffic various parameters may be measured. As a non-limited list of examples, average throughput in a particular unit of time, real-time through put, average utilization in a particular unit of time, real-time utilization, average latency in a particular unit of time and/or real-time latency of network communication packets may be monitored and/or measured. In addition, measurements may be taken over different routes, over a complete loop, over the entire private network, over sub-networks, over a logical broadcast domain, between any two or more nodes, etc., etc. These are just a few examples of the almost limitless set of measurements that may be computed for a private network. Likewise, therefore, an embodiment may also include a capability to reconfigure the private network without human intervention to improve network performance and/or to reduce network cost and/or a capability to reconfigure the private network including reallocation of network resources and/or geographical reconfiguration of the private network, such as substantially in accordance with various measured network performance and/or cost parameters so as to result in adjustment and/or tuning thereof.

As indicated previously, a private network may comprise at least two logical broadcast domains. Thus, in an embodiment, for example, one or more overlaid networks may include a capability to perform discovery and reflection of at least one of the at least two logical broadcast domains, of both of at least two LBDs, or of some or even of all LBDs where there may be more than two. In an embodiment, at least two logical broadcast domains forming an overlaid private network may be virtually linked, such as previously described. For example, in an embodiment, a tunnel server may be employed to link two logical broadcast domains. Thus, in an embodiment, for example, one or more overlaid private networks may include a capability to bypass routers performing network address translation. One potential benefit, although claimed subject matter is not limited in scope in this respect, may include potentially reduced network traffic at least in connection with network discovery, for example.

Another potential benefit, although again, claimed subject matter is not limited in scope in this respect, may include a capability to execute deployment of network services and/or network resources, as described in more detail, in particular on demand deployment. As suggested, in this context, in general, resources refer to physical resources, such as may be provided by hardware (e.g., additional memory and/or processing capability). Likewise, in general, applications refer to software-related applications (e.g., at least partially implemented via software). The term 'services' refers generally to provisioning a capability for use, such as via a particular private network, which may, for example, include provisioning of resources and/or applications for use.

In an embodiment, the capability to execute on demand deployment of network services and/or network resources may include marginal network resource allocation. As a non-limiting illustrative example, a private network or sub-network may operate more effectively if additional memory or computing resources are brought online relatively quickly. Likewise, the capability to execute deployment of network services and/or network resources may include network scaling, such as up scaling or downscaling, which may also be implemented via on demand deployment of network services and/or network resources. Again, for example, if network utilization or network packet latency increases or decreases to an extent that may result in a noticeable effect on network performance, scaling up or scaling down resources as appropriate may be handled in real time, for example. Furthermore, in an embodiment, one or more overlaid private networks may include a capability to execute deployment of network services and/or network resources without human intervention based at least in part on a measured increase in network utilization and/or network latency, a measured reduction in network bandwidth or any combinations thereof. For example, without limitation as an illustrative example, network traffic may be monitored and/or measured.

As mentioned previously, a capability also exists in an embodiment to virtually deploy network-related features, such as network resources, network services and/or network applications. By providing both a simple graphical user interface and a sophisticated network infrastructure, as previously described, for example, it is possible to quickly integrate additional services that are developed by Pertino or by other companies that may work in cooperation with Pertino, without the use of costly hardware, experience and/or IT staff. These services, some of which may be pre-integrated, may, for example, in an embodiment, be presented to a user as an upgrade or add-on option to a base connectivity service, for example, if desired.

Of course, deployment of network-related features may depend at least in part on details of a feature. For example, "in line" type services, such as deep packet inspection and/or virus protection, as discussed, may relate to a private network "hop," for example. Likewise, addition (or removal) of infrastructure, such as adding memory, adding an exchange server or even adding a virtual device, may be accomplished via a logical broadcast domain, along with an associate logical broadcast domain configuration. For example, without limit, after a user request, a controller may initiate provisioning and/or deployment. Along similar lines, services related to generating reports of private network related activity, for example, may be accomplished via a management device, which may or may not be included in a private network, as described, for example, in previously referenced US patent application U.S. patent application Ser. No. 14/763,805. For example, a user request may result in a controller query of a database, which may be local or otherwise accessible. Likewise, some network-related features may be deployed using one or more controllers, one or more tunnel servers, one or more gateway devices of one or more logical broadcast domains, one or more logical broadcast domain configurations, querying one or more databases, or any combinations thereof. For example, a geo location feature, as one example, may employ some combination of components.

Of course, claimed subject matter is not limited to illustrative embodiments, nonetheless, in one example embodiment, a simple to use graphical user interface that enables network owners/administrators to choose network-related features may be provided. For example, although claimed subject matter is not necessarily limited in scope in this respect, an example of a GUI (along with related technology) may be discussed in U.S. patent application Ser. No. 14/763,805, titled "PEOPLE CENTRIC MANAGEMENT OF CLOUD NETWORKS VIA GUI", filed on Jan. 22, 2013, by Cartsonis et al., herein incorporated by reference in its entirely and assigned to the assignee of claimed subject matter. After provisioning, an interface may also in an embodiment enable management and/or decommission of services, if desired, in an embodiment. As an example, a dashboard using widgets and well as dedicated management applications may be provided in an embodiment.

As previously mentioned, a tunnel server, for example, may, in an embodiment, be employed to provide a virtual and/or online presence that may be employed to deploy network-related features. It is, of course, however, appreciated that claimed subject matter is not limited to creating a virtual and/or online presence for deployment of network-related features to a private network via a tunnel server. Other approaches are possible and are intend to be included within claimed subject matter. Nonetheless, continuing with this embodiment example, as mentioned, a tunnel server, for example, may be employed to monitor and/or measure network traffic. To do so may involve, for example, termination of signal packet encapsulation. After termination of encapsulation, subsequent re-encapsulation may then permit a signal packet to continue to traverse a private network in an embodiment. A process of termination of encapsulation and re-encapsulation may in this context be termed a private network "hop." Implementation of a private network "hop," in an embodiment, provides, in addition to centralized management of a private network, as previously mentioned, a capability to generate or provide a mechanism for deployment of network-related features. Thus, a private network provider, such as Pertino, for example, in effect, may become a virtual member of every private network that it provides or generates for its users, if desired. As a network member, Pertino therefore, is able to deploy network-related features largely on demand, in a seamless, turnkey fashion, with little technical know-how needed by the user, in a manner that is dynamic, configurable and/or reconfigurable in real-time, potentially global in scope, scalable, without ownership of hardware, as well as other potential benefits, as described in more detail later. Of course, claimed subject matter is not limited in scope to any particular advantage since it may dependent on the particular embodiment.

As mentioned previously, an embodiment of claimed subject matter may include deploying networking services, resources and/or applications for one or more private networks via the Internet without human intervention. In an embodiment, deploying of network-related features may be executed via a virtual online presence, such as may be, for example, accessible via the Internet. In an embodiment, network features that are capable of being virtually deployed, such as via an online presence, for example, may include packet path services, network diagnostic and/or analysis services, such as a private network dashboard, for example, network configuration and/or reconfiguration services, network resource additions and/or reductions, and/or network application additions and/or reductions, to provide only a few out of a host of possible examples.

As has been mentioned, in one embodiment, a virtual online presence may comprises one or more virtual devices executing on one or more servers, such as one or more servers owned by one or more third parties. Although claimed subject matter is not limited in scope in this respect, virtual deploying of network-related features may comprise intercepting private network signal packet transmissions via one or more devices, such as virtual devices. Typically, although not necessarily, intercepting private network signal packet transmissions may comprises intercepting any and all private network outbound and inbound signal packet transmissions. As discussed, in an embodiment, intercepting network traffic may take place via a private network hop for private network signal packet transmissions. For example, a private network hop may be implemented in connection with a tunnel server. Likewise, of course, multiple private network hops may be employed to intercept network traffic, such as at various locations of a private network (e.g., where private network traffic is accessible).

In connection with monitoring network traffic various parameters may be measured. As a non-limited list of examples, average throughput in a particular unit of time, real-time through put, average utilization in a particular unit of time, real-time utilization, average latency in a particular unit of time and/or real-time latency of network communication packets may be monitored and/or measured. In addition, measurements may be taken over different routes, over a complete loop, over the entire private network, over sub-networks, over a logical broadcast domain, between any two or more nodes, etc., etc. These are just a few examples of the almost limitless set of measurements that may be computed for a private network. Likewise, therefore, an embodiment may also include a capability to reconfigure the private network without human intervention to improve network performance and/or to reduce network cost and/or a capability to reconfigure the private network including reallocation of network resources and/or geographical reconfiguration of the private network, such as substantially in accordance with various measured network performance and/or cost parameters so as to result in adjustment and/or tuning thereof. In an example embodiment, a method, therefore, may comprise dynamically configuring a private network to achieve one or more particular network performance parameter thresholds and/or one or more particular network cost parameter thresholds without human intervention. Likewise, after configuration, an embodiment may also dynamically reconfigure a private network to achieve one or more particular network performance parameter thresholds without human intervention. For example, one or more particular network performance parameter thresholds may include, in a particular unit of time: throughput, utilization, latency, outage, jitter, congestion, quality (e.g., quality of service), or any combinations thereof. Typically, outage refers to a network connection failure, such as where a route in essence goes "open circuit." Congestion generally refers to a situation in which signal packets are dropped. The terms jitter and quality of service, although generally well-understood by those of ordinary skill in the relevant art, may at times vary somewhat in terms of actual measurement with a particular context or situation.

Likewise, configuring or reconfiguring in an embodiment may take place without deploying additional hardware infrastructure and may, instead, employ existing infrastructure. Along similar lines, although in Internet traffic engineering, for example, routing of signal packets may be pre-planned, such as via particular carriers, as an example, in an embodiment, using an approach as previously described, for example, traffic engineering may take place implicitly via dynamically reconfiguring a private network in a manner that may take place without pre-planned routing of signal packets. It is likewise noted that carriers themselves may employ a similar approach rather than engaging in explicit or express route pre-planning, that is, express or explicit Internet traffic engineering.

Although claimed subject matter is not limited in scope to particular performance parameters, since a host of different performance parameters may be used with adequate results, examples may include, in a particular unit of time: throughput, utilization, latency, outage, jitter, congestion, quality (e.g., quality of service), or any combinations thereof. Typically, outage refers to a network connection failure, such as where a route in essence goes "open circuit." Congestion generally refers to a situation in which signal packets are dropped. The terms jitter and quality of service, although generally well-understood by those of ordinary skill in the relevant art, may at times vary somewhat in terms of actual measurement with a particular context or situation. It is likewise noted that a variety of potential routes may be monitored and/or measured in order to generate performance results for use in reconfiguration determinations to take place without human intervention. For example, two or more routes between two nodes may be compared; a complete loop may be evaluated, a entire private network, a sub-network, a logical broadcast domain, etc., etc., or any combinations thereof. The possible routes are virtually limitless and, likewise, a large number of possibilities exist. Likewise, an embodiment may monitor and/or measure routes by provisioning one or more tunnel servers, for example, even if a tunnel server is otherwise not being employed for directing network traffic, as a mechanism for additional measuring and/or monitoring.

In a particular embodiment, dynamically reconfiguring may therefore include the following. Signal packet traffic along various available network routes may be monitored and/or measured. Statistics regarding monitored and/or measured signal packet traffic along available network routes may be compiled. Additional resources may be deployed along relatively higher performing networking routes based at least in part on compiled statistics. Likewise, fewer resources may be deployed along relatively lower performing networking routes based at least in part on compiled statistics. Thus, a private network may be reconfigured without human intervention based at least in part on a measured increase in network utilization, a measured increase in network latency, a measured reduction in network bandwidth or any combinations thereof. Likewise, as previously described and as described later, a variety of types of reconfiguring may take place, such as reallocation of network resources and/or geographical reconfiguration.

Referring to FIG. 1, LBDs 209, 210 and 214 are illustrated, for example. A controller 206 and a tunnel server 260 are also illustrated, as described in more detail below. In one embodiment, independent logical broadcast domains may exist before a virtual broadcast domain is to be generated via linking LBDs, for example; although "pre-existing" BDs is not intended to be a requirement. Gateway devices (GDs) 215, 211, and 208 may be included within respective LBDs or may be generated or produced, such as, in one example embodiment, through installation of a software application on a device, such as a network device, for example, or through another mechanism. GDs 215 and 211 may communicate with controller 206 in one embodiment. Gateway devices 211 and 215 may, for example, transmit a broadcast domain configuration to controller 206. Likewise, controller 206 may provision tunnel server 260 and may notify gateway devices 211 and/or 215 of a network address for tunnel server 260. Likewise, tunnel server 260 may link logical broadcast domains 214 and 210, in an embodiment. Tunnel server 260 may in another embodiment also link more than two independent logical broadcast domains, such as more than two pre-existing LBDs, for example. Again pre-existing BDs are discussed for illustration purposes, but being pre-existing is not intended as a requirement.

Gateway devices 211 and 215 may transmit signal packets comprising a broadcast domain configuration to tunnel server 260. A tunnel server may forward signal packets, previously received, for example, that may comprise a broadcast domain configuration, such as via forwarding from gateway device 211 to gateway device 215, for example. A tunnel server, such as 260, may also forward signal packets, previously received, for example, that may comprise a broadcast domain configuration, such as for-warding to gateway device 211, for example. A virtual broadcast domain (VBD), therefore, may be generated at least for a period of time by linking logical broadcast domain 214 and logical broadcast domain 210, for example, to generate a private network.

Depending at least in part on particulars of an embodiment, gateway devices, such as 211 and 215, for example, may, in an embodiment, emulate a received broadcast domain configuration, as shall be explained in more detail infra., and as may be discussed, for example, (along with related technology) in previously referenced U.S. patent application Ser. No. 13/543,729, titled "COMMUNICATION BETWEEN BROADCAST DOMAINS," filed on Jul. 6, 2012, by Hankins et al., which is assigned to the assignee of the presently claimed subject matter and is herein incorporated by reference in its entirety; however, these examples, including examples from U.S. patent application Ser. No. 13/543,729, of course, are simply provided as illustrative examples and are not intended to limit claimed subject matter in scope. Gateway devices 211 and 215 may, for example, emulate a received broadcast domain configuration from other sources, such as, but not limited to, controllers, tunnel servers, other gateway devices, etc., for example. In a similar manner, more than two logical broadcast domains may be linked, such as previously mentioned. A gateway device may receive a broadcast domain configuration from a plurality of other gateway devices communicating entirely, primarily or at least partially via other logical broadcast domains, for example.

In one embodiment, as previously disclosed, responsive to initiated signal packets, a controller may initiate instructions for gateway devices, such as 208, 211, and 215, for example, to communicate with and/or via a tunnel server, such as 260, for example. Gateway devices 208, 211, and 215 may communicate with and/or via a tunnel server, such as 260. Gateway device 211 may generate a broadcast domain configuration corresponding to logical broadcast domain 210, for example. Gateway device 208 may generate a broadcast domain configuration corresponding to logical broadcast domain 209, for example.

Gateway devices 208 and 211 may transmit respective generated broadcast domain configuration to controller 206. Controller 206 may forward broadcast domain configurations, such as received from other gateway devices, for example, to gateway device 215. Gateway device 215 may emulate multiple received broadcast domain configurations as part of logical broadcast domain 214. For example, as an illustration, network device 216 may discover network device 223 communicating as part of logical broadcast domain 209 and/or network device 212 communicating as part of logical broadcast domain 210. As mentioned, although not necessarily required, in an embodiment, software implemented applications may at least partially or primarily be employed to implement operations, such as these illustrations, for example.

Continuing with the embodiment of FIG. 1, as an illustration of one possible scenario, network device 216 may communicate a request, such as by transmitting one or more signal packets, such as to network device 223, for example. Thus, via gateway device 215, for example, one or more signal packets comprising a request may be forwarded from network device 216 to tunnel server 260. Tunnel server 260 may, as a result, forward one or more signal packets, such as to gateway device 208, for example. Gateway device 208 may transmit signal packets via a logical broadcast domain, here 209, for example. Since network device 223 comprises part of logical broadcast domain, it may therefore receive a request that may be viewed as an emulation of a request from network device 216 via the now local logical broadcast domain. Thus, network device 223 may accept the request and respond according to established network protocols in an embodiment, for example. In this illustrative example, a response may likewise be forwarded back via gateway device, 208, and tunnel server 260, to gateway device 215 for emulation as part of logical broadcast domain 214. Gateway device 215 may transmit one or more signal packets via logical broadcast domain 214 indicating an accepted request from network device 223 to network device 216. Thus, network devices 216 and 223 may communicate via a virtual broadcast domain comprising LBDs 209 and 214, in this example, and by-passing NAT implemented by routers, for example. Thus, a private network managed by controller 206 has been illustrated by this example. In an implementation, network devices 216 and 223 may or may not recognize that their transmissions are forwarded via a tunnel server and/or to other logical broadcast domains. As mentioned, again, in an embodiment, although not necessarily required, software implemented applications may at least partially or primarily be employed to implement operations, such as these illustrations, for example.

In FIG. 1, routers 202, 203, or 204, for example, may route signal packets, such as between logical broadcast domains or to a controller, such as a master controller. Thus, a gateway device 215 may transmit a generated broadcast domain configuration to a controller or a master controller, such as 206. Controller 206 may store a generated broadcast domain configuration received from a gateway device, such as device 215, for example, using a memory device 207. Memory device 207 may comprise a local storage device or a non-local memory device otherwise accessible by controller 206, for example. In an embodiment, as previously described, likewise a database associating users, devices and other network-related traits may also be stored there.

In one embodiment, routers 202, 203, or 204 may employ network address translation (NAT). Typically, routers that employ NAT may modify a signal packet by altering a source address of a source device that may be part of a logical broadcast domain (likewise, a router employing NAT may also modify a destination address). Therefore, a signal packet transmission from a router employing NAT may appear as though the signal packet originated from the router rather than having originated elsewhere. Likewise, network devices on a logical broadcast domain may have an intervening router, or a similar device performing network address translation, for example, between the logical broadcast domain and other networks. Therefore, other portions of a network that have other logical broadcast domains, may not conventionally be accessible to devices operating as part of the other broadcast domains, at least not without some form of network address translation conventionally taking place. Likewise, routers employing NAT also may in some situations not necessarily allow signal packets to traverse a particular logical broadcast domain if the packets originate from outside the particular logical broadcast domain (e.g., not permit signal packets to reach a network device that may be part of the particular LBD). However, in an embodiment, for example, such as implementing a private network, NAT may be by-passed, such as previously described, for example. Thus, other devices may be accessible despite intervening routers without a significant change in infrastructure.

While, as described NAT implemented by routers are by-passed for signal packet transmissions within the private network, in this example; nonetheless, a NAT device may be included for connecting or linking the private network to the Internet, as previously suggested. Although claimed subject matter is not limited in scope in this respect, as mentioned, a feature of such an embodiment, for example, may include a unified networking policy being implemented across a private network as well as selected networking policies implemented for selected portions (e.g., selected sub-networks), as previously described. Thus, for example, referring to FIG. 1, a NAT device 265 coupled to tunnel server 260 may be able to connect a private network to the Internet by implementing network address translation for signal packets outbound from TS 260 to the Internet. As shown in FIG. 1, NAT device 265 may be in communication with controller 206. Thus, controller 206, in this example, may exercise oversight of inbound and outbound communications between the private network and the Internet. Likewise, as previously described, a unified networking policy or selected networking policies may be implemented in this manner for a network or selected sub-networks.

As discussed previously, in an embodiment, a virtual broadcast domain may comprise logical broadcast domain 214, and logical broadcast domain 210. Therefore, network device 216, communicating as part of logical broadcast domain 214, may discover and/or request services from a messaging server 224, communicating as part of logical broadcast domain 210. Also, network device 212, communicating as part of logical broadcast domain 210, may discover and/or request services from a file server 220, communicating as part of logical broadcast domain 214. Of course, claimed subject matter is not limited in scope to example embodiments, such as the foregoing provided for illustrative purposes, for example.

Although claimed subject matter is not limited in scope in this respect, in an embodiment, as was mentioned, a potential feature may include centralized management, such as, for example, of a broadcast domain, and/or multiple broadcast domains, despite, for example, the distributed nature of devices in the respective BDs, such as with intervening independently managed network devices, as occurs in connection with the Internet, as one example. Additionally, in an embodiment, a secure, scalable, real-time, turnkey, web-related private network that is relatively simple and/or easy to maintain, modify and/or manage may be set up. As mentioned, again, in an embodiment, although not necessarily required, software implemented applications on or above infrastructure, such as computing and/or networking infrastructure, as well as network connectivity, may at least partially or primarily be employed to implement operations, such as these illustrations, for example.

As was discussed, in an embodiment, controller 206 may be accessed via a device, such as a network device. A controller, such as controller 206, may receive broadcast domain configurations from other gateway devices communicating via other logical broadcast domains, whereby more than two logical broadcast domains may be similarly linked such that devices communicating via one of a plurality of logical broadcast domains, may discover and/or request services available via devices communicating via another of the plurality of logical broadcast domains. For example, controller 206 may also receive a broadcast domain configuration from gateway device 208, communicating via logical broadcast domain 209. Controller 206, may also forward other received broadcast domain configurations from logical broadcast domains 214, or 210, for example, to logical broadcast domain 209, for example, to be emulated via gateway device 208 or otherwise emulated.

Referring to FIG. 1, as previously discussed, a broadcast domain configuration may include devices communicating via a virtual private network (VPN), for example. In this context, a VPN refers to a mechanism in which a remote host, such as a network device, communicates with a VPN server to encrypt a communication stream in a manner so that the remote host is able to reasonably securely communicate with other devices of the broadcast domain and in which an intervening router has a configuration that allows the remote host to initiate the VPN even with network address translation being implemented. A device communicating via a VPN, such as virtual device 222, may connect to logical broadcast domain 214, or disconnect from logical broadcast domain 214. Likewise, as discussed with other examples, here, an example embodiment, such as this one, may be manageable from a device, such as a network device and/or a computing device.

Likewise, a tunnel server may be accessed and/or managed from a device, such as a network device and/or a computing device. In one embodiment, a tunnel server, such as tunnel server 260, shown in FIG. 1, for example, may be employed to also perform functions of a controller. For example, one or more software implemented applications may implement desired operations. Tunnel server 260 may, for example, receive a broadcast domain configuration. Tunnel server 260 may forward one or more broadcast domain configurations to one or more gateway devices. Tunnel server 260 may forward one or more broadcast domain configurations based at least in part on currently communicating devices, such as a network device, or otherwise, for example, such as stored BD configurations, as another example. Additionally, a linking table or other mechanism, for example, may specify forwarding rules or the like, to, for example, specify linking or additional functionality, such as between logical broadcast domains, for example, to form a virtual broadcast domain. In another embodiment, tunnel server 206 may transmit a portion (e.g., digest or subset) of a generated broadcast domain configuration. For example, in an embodiment, a generated broadcast domain configuration may comprise a selection of a set or subset of features of a logical broadcast domain 210 to be forwarded, such as to one or more gateway devices, for example, by tunnel server 260, operating as a controller, in this illustrative example.

Similarly, virtual devices for a private network may also be managed from a network device, even a virtual network device or other virtual device. In an embodiment, emulation may comprise, for example, a first device simulating another device via a broadcast domain. Another device, in this example, may comprise a physical network device, or a virtual network device. Therefore, the emulated device may not exist as a physical piece of hardware, although may be executed or stored on a physical device, of course. An emulating device may, however, make services available via a broadcast domain by transmitting signal packets in which, for example, requests for services may be forwarded to the emulated device to perform advertised services, for example, if the emulated device comprises a physical device. In another embodiment, an emulating device may offer services via a logical broadcast domain without forwarding requests to another network device. Additionally, emulation, in an embodiment, may comprise imitating another device, such as a network device and/or a computing device. However, another device may exist virtually, and/or may comprise a set instructions being executed via another device. Although services may appear to be available via a device (e.g., physical device), the device may, therefore, in an embodiment, comprise a virtual device. Likewise, as suggested previously, the virtual device may be executing on a physical device owned by a third party making processing and/or memory capacity available for purchase, for example. Likewise, as indicated previously, for these various aspects, NAT 265 is able to provide a capability to connect a private network to the Internet, such as under direction or oversight of controller 206, for example.

It is likewise noted that in an alternate embodiment, a NAT device may be incorporate into a tunnel server, such as 260, for example. Likewise, as was described, a tunnel server may execute additional services. Again, although not necessarily, typically services may be implemented using one or more software applications, as was mentioned. For example, in an embodiment, a tunnel service may also include a capability implement a private network policy and inspection process, which may, for example, including a unified networking policy, despite potentially being physically or logically separate networks and/or physically or logically separate sub-networks, for example. A private network policy and inspection process may also include for selected networks and/or sub-networks employing selected policies or selected networks and/or sub-networks employing a unified policy. Selected networking policies or a unified networking policy may, for example, include particulars regarding implementing at least one of the following processes: virus scanning, authentication, filtering (for example, URL filtering), deep packet inspection, encryption, a firewall, or any combinations thereof, as an example. A NAT device, such as 260, may be employed to maintain state of interactions between devices in the private network and devices outside the private network, such as Internet host devices, for example. As a result, some trade-offs may exist regarding whether to incorporate the NAT within the tunnel server in an embodiment. Since, if the NAT fails, state may be lost between the private network and the Internet, and a disruption of service may occur until connections may be re-established.

In one possible approach, NAT functionality may be included with a tunnel server, such as one tunnel server per NAT. If a server fails on which a TS is executed, the users on the private network are impacted, but not necessarily others. In another approach, the NAT may comprise a separate component, such as 265, illustrated in FIG. 1, and multiple tunnel servers may potentially connect to the Internet via 265, for example. Thus, if a TS fails, but not the NAT, state is generally maintained with the Internet; however, if the NAT fails, more users may be impacted. In still another approach, a TS and a NAT may comprise separate components (such as software applications executing on separate physical devices, for example), but may still do so in one-to-one relationship. This approach has some partial fault tolerance benefits, but may increase cost and/or complexity. Likewise, an approach other than one-to-one, such as two-to-one, etc., may be employed in an embodiment. Although claimed subject matter is not necessarily limited in scope in this respect, additional example embodiments of connecting to the Internet via a NAT (along with related technology) may be discussed in U.S. patent application Ser. No. 13/802, 529, titled "CONNECTING A CLOUD NETWORK TO THE INTERNET," filed on Mar. 13, 2012, by Hankins et al., herein incorporated by reference in its entirety and assigned to the assignee of currently claimed subject matter.

Additionally, as previously mentioned, a tunnel server may, in an embodiment, be employed to provide a virtual and/or online presence that may be employed to deploy network services, resources and/or applications, referred to here as network-related features. It is, of course, however, appreciated that claimed subject matter is not limited to creating a virtual and/or online presence for deployment of network-related features to a private network via a tunnel server. Furthermore, as previously explained, deployment may likewise vary with details regarding particular network-related features. Other approaches are possible and are intend to be included within claimed subject matter. Nonetheless, a tunnel server, for example, may be employed to monitor and/or measure network traffic. Implementation of a private network "hop," in an embodiment, provides, in addition to centralized management of a private network, as previously mentioned, a capability to generate or provide a mechanism for deployment of network-related features. Thus, a private network provider, such as Pertino, for example, in effect, may become a virtual member of every private network that it provides or generates for its users, if desired. As a network member, Pertino therefore, is able to deploy network-related features largely on demand, in a seamless, turnkey fashion, with little technical know-how needed by the user, in a manner that is dynamic, configurable and/or reconfigurable in real-time, potentially global in scope, scalable, without ownership of hardware, as well as other potential benefits, as described in more detail later. Of course, claimed subject matter is not limited in scope to any particular advantage since it may dependent on the particular embodiment.

As previously mentioned, a tunnel server, for example, may be employed to monitor and/or measure network traffic. To do so may involve, for example, termination of signal packet encapsulation. After termination of encapsulation, subsequent re-encapsulation may then permit a signal packet to continue to traverse a private network in an embodiment. A process of termination of encapsulation and re-encapsulation may in this context be termed a private network "hop." Implementation of a private network "hop," in an embodiment, provides, in addition to centralized management of a private network, as previously mentioned, a capability to generate or provide a mechanism for deployment of network-related features, for example, network configuration and/or reconfiguration services, network resource additions and/or reductions, and/or network application additions and/or reductions, to provide only a few out of a host of possible examples.

Although claimed subject matter is not limited in scope in this respect, virtual deploying of network-related features may comprise intercepting private network signal packet transmissions via one or more devices, such as virtual devices. Typically, although not necessarily, intercepting private network signal packet transmissions may comprise intercepting any and all private network outbound and inbound signal packet transmissions. As discussed, in an embodiment, interception network traffic may take place via a private network hop for private network signal packet transmissions. For example, a private network hop may be implemented in connection with a tunnel server. Likewise, of course, multiple private network hops may be employed to intercept network traffic, such as at various locations of a private network (e.g., where private network traffic is accessible).

Although claimed subject matter is not limited in scope to particular performance parameters, since a host of different performance parameters may be used with adequate results, examples may include, in a particular unit of time: throughput, utilization, latency, outage, jitter, congestion, quality (e.g., quality of service), or any combinations thereof. Typically, outage refers to a network connection failure, such as where a route in essence goes "open circuit." Congestion generally refers to a situation in which signal packets are dropped. The terms jitter and quality of service, although generally well-understood by those of ordinary skill in the relevant art, may at times vary somewhat in terms of actual measurement with a particular context or situation. It is likewise noted that a variety of potential routes may be monitored and/or measured in order to generate performance results for use in reconfiguration determinations to take place without human intervention. For example, two or more routes between two nodes may be compared; a complete loop may be evaluated, a entire private network, a sub-network, a logical broadcast domain, etc., etc., or any combinations thereof. The possible routes are virtually limitless and, likewise, a large number of possibilities exist. Likewise, an embodiment may monitor and/or measure routes by provisioning one or more tunnel servers, for example, even if a tunnel server is otherwise not being employed for directing network traffic, as a mechanism for additional measuring and/or monitoring. These are just a few examples of the almost limitless set of measurements that may be computed for a private network. Likewise, therefore, an embodiment may also include a capability to reconfigure the private network without human intervention to improve network performance and/or to reduce network cost and/or a capability to reconfigure the private network including reallocation of network resources and/or geographical reconfiguration of the private network, such as substantially in accordance with various measured network performance and/or cost parameters so as to result in adjustment and/or tuning thereof.

Figure 2:
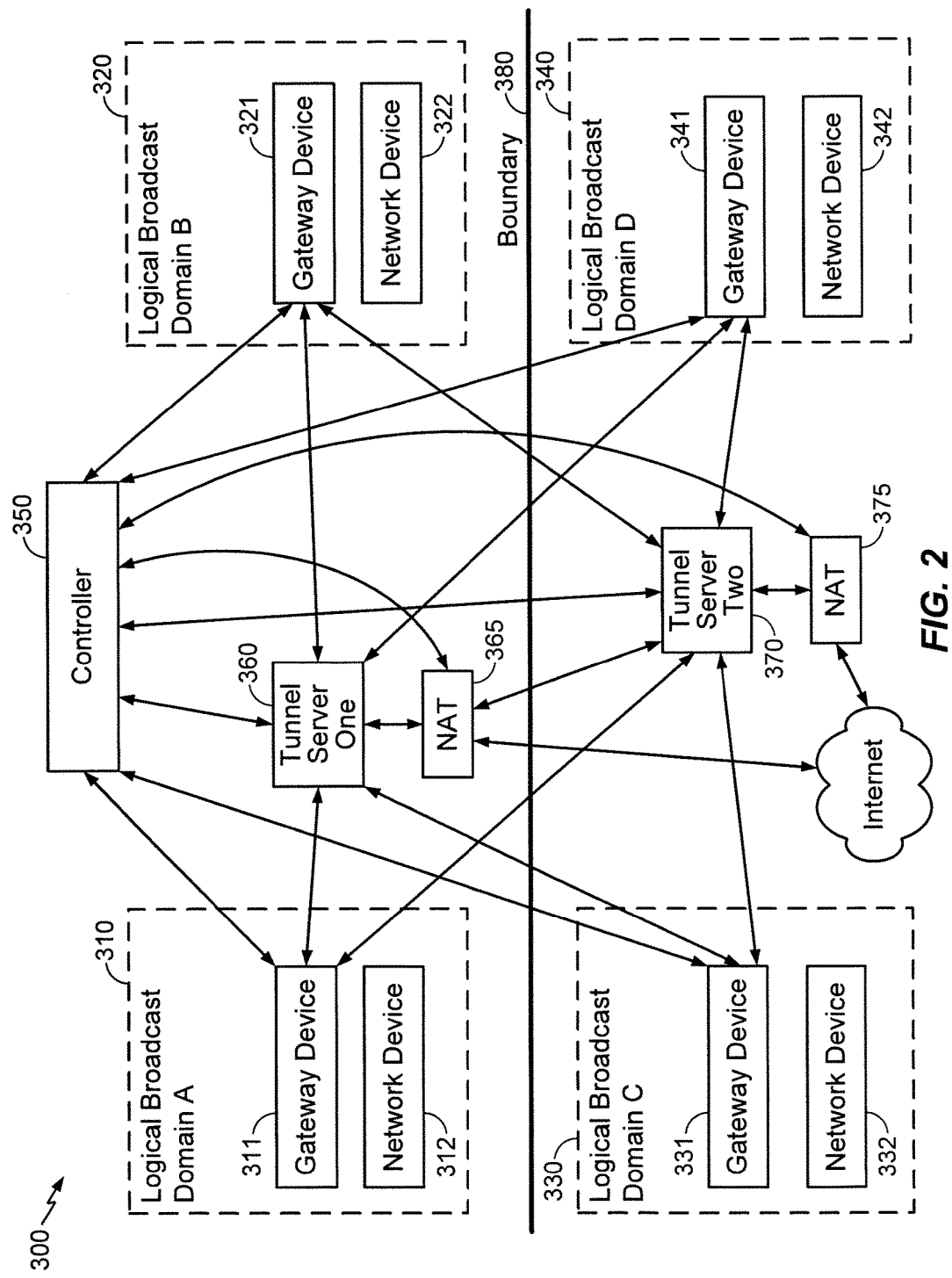
FIG. 2 is a schematic diagram illustrating another embodiment.

In an embodiment, more than one tunnel server may be employed to link a plurality of logical broadcast domains to form a virtual broadcast domain, although, of course, claimed subject matter is not limited in scope in this respect. FIG. 2 is a schematic diagram showing an embodiment with more than one tunnel server in one illustrative non-limiting example. In one embodiment, for example, four logical broadcast domains may be in communication via more than one tunnel server. Gateway devices 311, 321, 331, and 341 may generate a broadcast domain configuration for their respective logical broadcast domains, for example. Gateway devices 311, 321, 331, and 341 may forward respective broadcast domain configurations to controller 350. Controller 350 may provision tunnel server one, shown as 360. Controller 350 may initiate instructions to gateway devices 311, 321, 331, and 341 to communicate with tunnel server one 360. Gateway devices 311, 321, 331, and 341 may therefore initiate communications, such as via signal packet transmissions, for example.

In one embodiment, logical broadcast domain A 310, and logical broadcast domain B 320 may be located within a similar geographic boundary, such as, the same building, the same city, the same state, the same country, the same continent, the same planet, or other, for example. In an embodiment, logical broadcast domain C 330, and logical broadcast domain D 340, may reside in another geographic region different from the geographic region where logical broadcast domain A 310 or logical broadcast domain B may reside. In one embodiment, for example, logical broadcast domain A 310 and logical broadcast domain B 320 may be physically located in Los Angeles, Calif., U.S.A, while logical broadcast domain C 330 and logical broadcast domain D 340 may be physically located in New York City, N.Y., U.S.A. Of course, these are simply examples for illustration and are not meant to be limiting in any way.

In this embodiment, tunnel server one 360, may also be physically located in Los Angeles, Calif., U.S.A. so that transmissions (e.g., signal packets) between logical broadcast domain C 330 and logical broadcast domain D 340 (e.g., communicating via tunnel server one 360, located in Los Angeles), may be transmitted to Los Angeles, and back to New York.

A path or channel for communications may potentially be enhanced by controller 350 provisioning an additional tunnel server located more physically proximate to logical broadcast domain C 330 and logical broadcast domain D 340, for example. Controller 350 may provision tunnel server two 370. For example, in an embodiment, provisioning a tunnel server may be accomplished via execution of one or more software applications. Controller 350 may therefore initiate instructions to gateway devices 311, 321, 331, and 341 to additionally initiate communications with tunnel server two 370, while also continuing to be in communication with tunnel server one 360, for example. Gateway devices 311, 321, 331, and 341 may thus initiate communications to tunnel server two 370 after being deployed. Furthermore, in an embodiment, although claimed subject matter is not limited in scope in this respect, transmissions, such as signal packet transmissions may take place between tunnel servers, such as 360 and 370, in this example.

Provisioning an additional tunnel server may be based at least in part on a variety of factors or considerations. For example, signal packets communicated via tunnel server one 360 may be a factor or a consideration. Provisioning an additional tunnel server may likewise be based at least in part on signals from a controller, other than controller 350, for example. Likewise, gateway devices may optionally communicate with other gateway devices, such as via tunnel server one or tunnel server two, for example, depending at least in part on a host of possible factors, such as, geography, latency, utilization, bandwidth (e.g., throughput), availability, efficiency, cost, etc. Furthermore, via a controller, such as 350, a private network may be reconfigured without human intervention, for example, to improve performance and/or reduce cost. For example, if available bandwidth decreases, if latency increases, and/or if network utilization increases, controller 350 may provision additional tunnel servers or may provision tunnel servers in a manner to improve performance and/or reduce cost without human intervention. Examples of possible monitoring and/or measurement of network performance and/or cost-related parameter were previously discussed.

As previously mentioned, a tunnel server, for example, may be employed to monitor and/or measure network traffic. To do so may involve, for example, termination of signal packet encapsulation. After termination of encapsulation, subsequent re-encapsulation may then permit a signal packet to continue to traverse a private network in an embodiment. A process of termination of encapsulation and re-encapsulation may in this context be termed a private network "hop." Implementation of a private network "hop," in an embodiment, provides, in addition to centralized management of a private network, as previously mentioned, a capability to generate or provide a mechanism for deployment of network-related features, for example, network configuration and/or reconfiguration services, network resource additions and/or reductions, and/or network application additions and/or reductions, to provide only a few out of a host of possible examples.

Although claimed subject matter is not limited in scope in this respect, virtual deploying of network-related features may comprise intercepting private network signal packet transmissions via one or more devices, such as virtual devices. Typically, although not necessarily, intercepting private network signal packet transmissions may comprise intercepting any and all private network outbound and inbound signal packet transmissions. As discussed, in an embodiment, interception network traffic may take place via a private network hop for private network signal packet transmissions. For example, a private network hop may be implemented in connection with a tunnel server. Likewise, of course, multiple private network hops may be employed to intercept network traffic, such as at various locations of a private network (e.g., where private network traffic is accessible).

Although claimed subject matter is not limited in scope to particular performance parameters, since a host of different performance parameters may be used with adequate results, examples may include, in a particular unit of time: throughput, utilization, latency, outage, jitter, congestion, quality (e.g., quality of service), or any combinations thereof. Typically, outage refers to a network connection failure, such as where a route in essence goes "open circuit." Congestion generally refers to a situation in which signal packets are dropped. The terms jitter and quality of service, although generally well-understood by those of ordinary skill in the relevant art, may at times vary somewhat in terms of actual measurement with a particular context or situation. It is likewise noted that a variety of potential routes may be monitored and/or measured in order to generate performance results for use in reconfiguration determinations to take place without human intervention. For example, two or more routes between two nodes may be compared; a complete loop may be evaluated, a entire private network, a subnetwork, a logical broadcast domain, etc., etc., or any combinations thereof. The possible routes are virtually limitless and, likewise, a large number of possibilities exist. Likewise, an embodiment may monitor and/or measure routes by provisioning one or more tunnel servers, for example, even if a tunnel server is otherwise not being employed for directing network traffic, as a mechanism for additional measuring and/or monitoring. These are just a few examples of the almost limitless set of measurements that may be computed for a private network. Likewise, therefore, an embodiment may also include a capability to reconfigure the private network without human intervention to improve network performance and/or to reduce network cost and/or a capability to reconfigure the private network including reallocation of network resources and/or geographical reconfiguration of the private network, such as substantially in accordance with various measured network performance and/or cost parameters so as to result in adjustment and/or tuning thereof.

As an example, gateway device 311 may transmit signal packets to gateway device 321. Gateway device 311 may transmit signal packets via tunnel server one 360 since tunnel server one 360 is more proximate to both gateway device 311 and gateway device 321 in this example. In another embodiment, gateway device 311 may transmit signal packets via tunnel server two 370, such as if tunnel server one may be unavailable, for a variety of reasons, such as, but not limited to one or more of the following situations:

a software issue, a configuration issue, a power issue, scheduled maintenance, insufficient permissions, a security issue, other issues, or combinations thereof.

Likewise, a variety of factors or considerations may likewise affect signal packet transmissions between already provisioned tunnel servers, such as 360 and 370, for example, in an embodiment. As a simple illustrative example, not meant to limit claimed subject matter, a tunnel server in Europe may communicate with a tunnel server in the United States to pass signal packet transmissions, such as from a broadcast domain in Europe to a broadcast domain in the United States; however, respective broadcast domains in Europe may communicate via the tunnel server in Europe while respective broadcast domains in the United States may communicate via the tunnel server in the United States. For example, again, without intending to limit claimed subject matter, it may be that latency is potentially reduced in comparison with using only either the tunnel server in Europe or only the tunnel server in the United States to pass signal packet transmissions from a broadcast domain in Europe to a broadcast domain in the United States. Of course, communications may also take place between more than two tunnel servers in an embodiment.

In still another example implementation involving more than two tunnel servers, for a stream of successive signal packets to be communicated between two broadcast domains, the signal packets may be communicated using more than one tunnel server in a manner so that immediately successive signal packets have a signal communication path that includes different tunnel servers. As one non-limiting example, a first broadcast domain may communicate signal packet transmissions to a second broadcast domain using a plurality of tunnel servers in a manner so that, for example, for N tunnel servers, where N is an integer greater than one, every Nth signal packet from the first broadcast domain may be transmitted to the second broadcast domain via the Nth tunnel server. Likewise, of course, every Nth signal packet from the second broadcast domain may be transmitted to the first broadcast domain via the Nth tunnel server; however, the Nth tunnel server from the first BD to the second BD may not necessarily correspond to the Nth tunnel server from second BD to the first BD. Of course, other approaches of distributing signal packet transmissions across multiple tunnel servers are also intended to be included. Implementations in which multiple tunnel servers are employed may offer a variety of potential benefits, although claimed subject matter is not necessarily limited in scope to implementations having these benefits. For example, security may be enhanced. Likewise, improved fault tolerance, redundancy and/or load balancing of tunnel servers may also be accomplished.

In one embodiment, tunnel server one 360, may specialize in file serving, and tunnel server two 370 may specialize in message serving. In an embodiment, gateway device 331, transmitting signal packets comprising file serving, may do so via tunnel server 360 or tunnel server 370. In general, a plurality of gateway devices may communicate with a plurality of tunnel servers. For example, provisioning additional tunnel servers may as one possible consideration, potentially enhance communications by providing alternate paths between gateway devices communicating as part of other logical broadcast domains that may be linked via tunnel servers. Nonetheless, one or more networks of logical broadcast domains and tunnel servers may be generated based at least in part on a host of considerations, such as, for example, cost, capability, efficiency, compatibility, resources, proximity, latency, bandwidth (e.g., throughput), utilization, others or combinations thereof. In one embodiment, network device 312 may communicate with or access network device 322, such as using gateway devices 311 and 321 communicating via tunnel server one 360, for example. Again, typically, but not necessarily, one or more software implemented applications may be utilized. Network device 322 may communicate with or access network device 342, such as using gateway devices 311 and 341 communicating via tunnel server two 370, for example. Gateway device 311 may also communicate via tunnel server one 360 and via tunnel server two 370, concurrently.

In an embodiment, a tunnel server may, for example, store one or more service requests, such as in local memory. In an embodiment, if multiple devices, such as a network device, request similar services, a tunnel server may provide service, or a response to a service request to a requesting device perhaps without forwarding the service request to a device able to initiate service, for example; however, this may vary at least in part on particulars of a situation and/or an embodiment, for example.

Additionally, in an embodiment, a tunnel server may acknowledge receipt of one or more signal packets before arrival at a destination device, such as a network device. For example, in one embodiment, network device 332 may transmit a file, or other large amount of stored information states (e.g., stored as physical states in memory), for example, to network device 322, such as via tunnel server one 360. In an embodiment, tunnel server one may acknowledge receipt of one or more signal packets before network device 322 acknowledges receipt of the one or more signal packets, for example. This may accelerate transmissions. For example, network device 322 may receive acknowledgement of one or more signal packets, and transmit subsequent signal packets with less delay as a result, for example, potentially improving wide area network communications, for example.

A tunnel server may also replicate services available via other network devices. In this context, replication comprises reading and writing stored information states (e.g., stored as physical states in memory). Replication may be desirable for a variety of reasons, including, improved consistency between two or more redundant resources, such as software or hardware components, improved reliability, improved accessibility, improved fault tolerance, or combinations thereof. Replication may comprise storage replication, and/or replication of computational tasks, or may comprise active or passive replication as is known in the art. Again, an implementation may be in accordance with execution of one or more software applications.

In one embodiment, tunnel server two 370, may store network communications. Network device 322 may comprise a file server, for example. A device, such as network device 312, may request file services from file server 322 via tunnel server two 370. Network device 312 may receive requested services. Subsequently, network device 332 may request similar file services from file server 322 via tunnel server two 370. Tunnel server two 370, having stored previous requests for file service, for example, may respond by providing a requested file service, without necessarily communicating a request to file server 322. A tunnel server may, for example, in an embodiment, potentially provide a faster response by storing previous service requests, referred to here as caching the previous service requests. In another example embodiment, a device such as network device 342 may comprise a database server. Tunnel server 370 may replicate the database (or a portion thereof) of database server 342. In an embodiment, if a device, for example, were to request database services from database server 342, via tunnel server two 370, tunnel server two 370 may respond, for example, without necessarily communicating with database server 342.

FIG. 2 also illustrates an embodiment in which, as previously described, separate NAT devices may be employed in a one-to-one relationship with tunnel servers; although, claimed subject matter is not limited to a one-to-one relationship, as previously explained. Thus, as illustrated, NAT 365 corresponds with TS 360 and NAT 375 corresponds with TS 370. Likewise, NATs 365 and 375 also may communicate with controller 350 in the embodiment illustrated. Therefore, benefits, such as previously described, may be available, although claimed subject matter is not limited in this respect. As one example, a unified networking policy or selected networking policies may be implemented, such as previously described. Again, software may execute or be executable on or above infrastructure to implement such policies, for example. Although claimed subject matter is not necessarily limited in scope in this respect, additional example embodiments of connecting to the Internet via a NAT (along with related technology) may be discussed in U.S. patent application Ser. No. 13/802,529, titled "CONNECTING A CLOUD NETWORK TO THE INTERNET," filed on Mar. 13, 2012, by Hankins et al., herein incorporated by reference in its entirety and assigned to the assignee of currently claimed subject matter.

Figure 4:
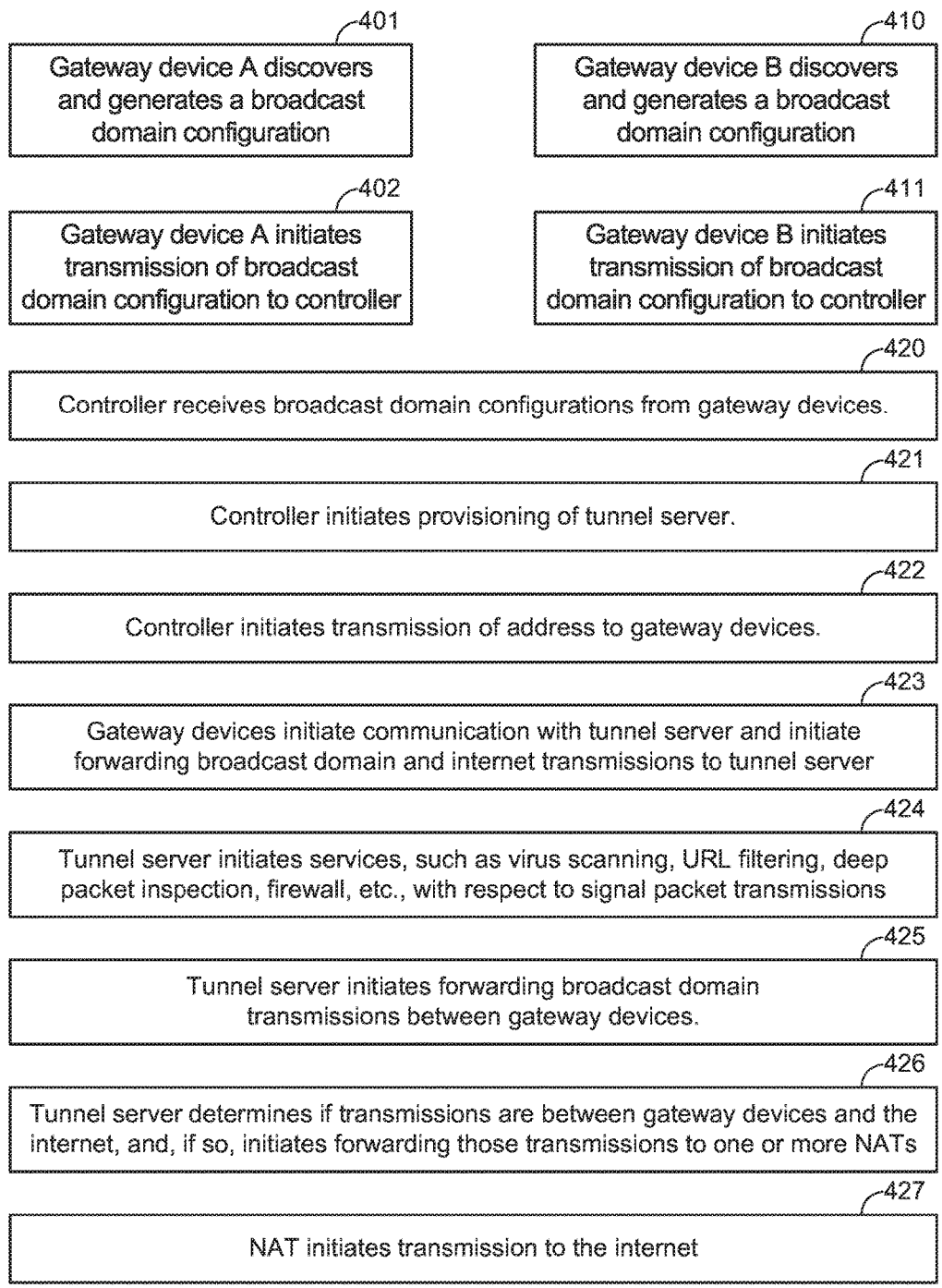
FIG. 4 is a flowchart illustrating an embodiment.

FIG. 4 is a flowchart illustrating an embodiment of a method of communication between broadcast domains. Of course, claimed subject matter is not limited in scope to the particular order or arrangement of blocks shown. Likewise, additional or replacement blocks may be included in an embodiment, such as blocks depicting one or more operations in place of those shown may be used in an embodiment, for example.

Referring to FIG. 4, gateway devices A and B may be included as part of separate logical broadcast domains in an example embodiment. As shown by block 401, gateway device A may discover and generate a broadcast domain configuration without human intervention, as part of a logical broadcast domain, for example. As shown by block 410, gateway device B may likewise discover and generate a broadcast domain configuration as part of a logical broadcast domain, for example. At block 402, gateway device A may initiate transmission of a generated broadcast domain configuration, such as in the form of signal packets, for example, to a controller or a master controller. At block 411, gateway device B may initiate transmission of a generated broadcast domain configuration, such as in the form of signal packets, for example, to a controller or a master controller. At block 420, a controller may receive one or more generated broadcast domain configurations from one or more gateway devices, such as A and/or B, for example.

FIG. 4 shows an embodiment including the blocks described above as well as the blocks described immediate below, starting with block 421. However, likewise, in an embodiment, a flowchart of provisioning a tunnel server may begin with block 421. Of course, as indicated above, claimed subject matter is not limited in scope to the particular order or arrangement of blocks shown. Likewise, additional or replacement blocks may be included in an embodiment, such as blocks depicting one or more operations in place of those shown may be used in an embodiment.

Referring to block 421, for example, a controller may initiate provisioning of one or more tunnel servers, such as for device A and/or device B, for example. At block 422, a controller may initiate transmission of one or more network addresses for one or more tunnel servers to gateway device A and/or gateway device B, for example. At block 423, gateway devices A and/or B may initiate communication with one or more tunnel servers, for example, via one or more network addresses for the respective one or more tunnel servers, for example. Likewise, the gateway devices may therefore forward broadcast domain and/or Internet signal packet transmissions to the one or more tunnel servers. At block 424, one or more tunnel servers may receive signal packets and may initiate network-related feature in an embodiment; however, as previously described, initiation of network-related features may depend at least in part on particulars of the feature. Thus, a feature may be initiated in another way, such as via a controller, for example. Services may include, for example, a private network policy and inspection process, which may include, as examples, virus scanning, filtering (for example, URL filtering), deep packet inspection, a firewall, and others, in connection with processing of the received signal packets. Likewise, as shown at block 425, the one or more tunnel servers may initiate forwarding of signal packets, such as between gateway devices, such as A and/or B, for example. At block 426, one or more tunnel servers may determine if any of the received signal packet transmissions are between a gateway device and the Internet (e.g., one or more devices accessible via the Internet) and, if so, may initiate forwarding of signal packets to one or more NAT devices, for example. At block 427, the one or more NAT devices may initiate transmission of signal packets to the Internet (e.g., to one or more devices accessible via the Internet to which the signal packets are directed). It is noted, that in an embodiment in which a NAT device is incorporated into a tunnel server, although this operation may occur, it may take place as part of tunnel server operation. Therefore, again, benefits, such as previously described, may be available, although claimed subject matter is not limited in this respect. For example, a unified networking policy or selected networking policies may be implemented.

Figure 6:
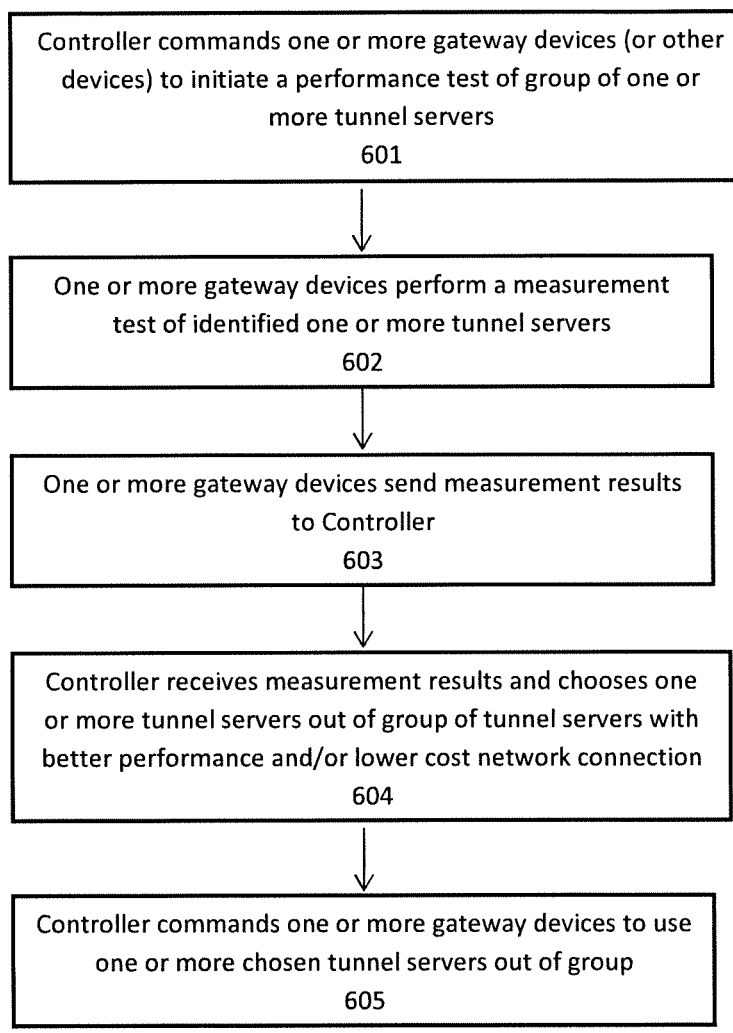
FIG. 6 is another flowchart illustrating an embodiment of configuring and/or reconfiguring a network without human intervention (e.g., implicit traffic engineering).

FIG. 6 shows a flowchart of another embodiment 600, such as may be used to implement implicit traffic engineering, such as for the Internet, as one example. Claimed subject matter is not limited in scope to the particular order or arrangement of blocks shown. Likewise, additional or replacement blocks may be included in an embodiment, such as blocks depicting one or more operations in place of those shown may be used in an embodiment.

At block 601, for example, a controller may command one or more gateway devices (or other devices) to initiate a performance test of group of one or more tunnel servers. One or more gateway devices may perform a measurement test of the identified one or more tunnel servers of the group, at block 602. The one or more gateway devices may then transmit measurement results to the controller, as shown at block 603. At block 604, the controller may receive the measurement results and may perform an evaluation to choose one or more tunnel servers from the group of tunnel servers that based at least in part on the measurement results demonstrate better performance and/or lower cost out of the group. The controller may then, at block 605, instruct the one or more gateway devices to employ the chosen one or more tunnel servers out of the group of tunnel servers.

Figure 3:
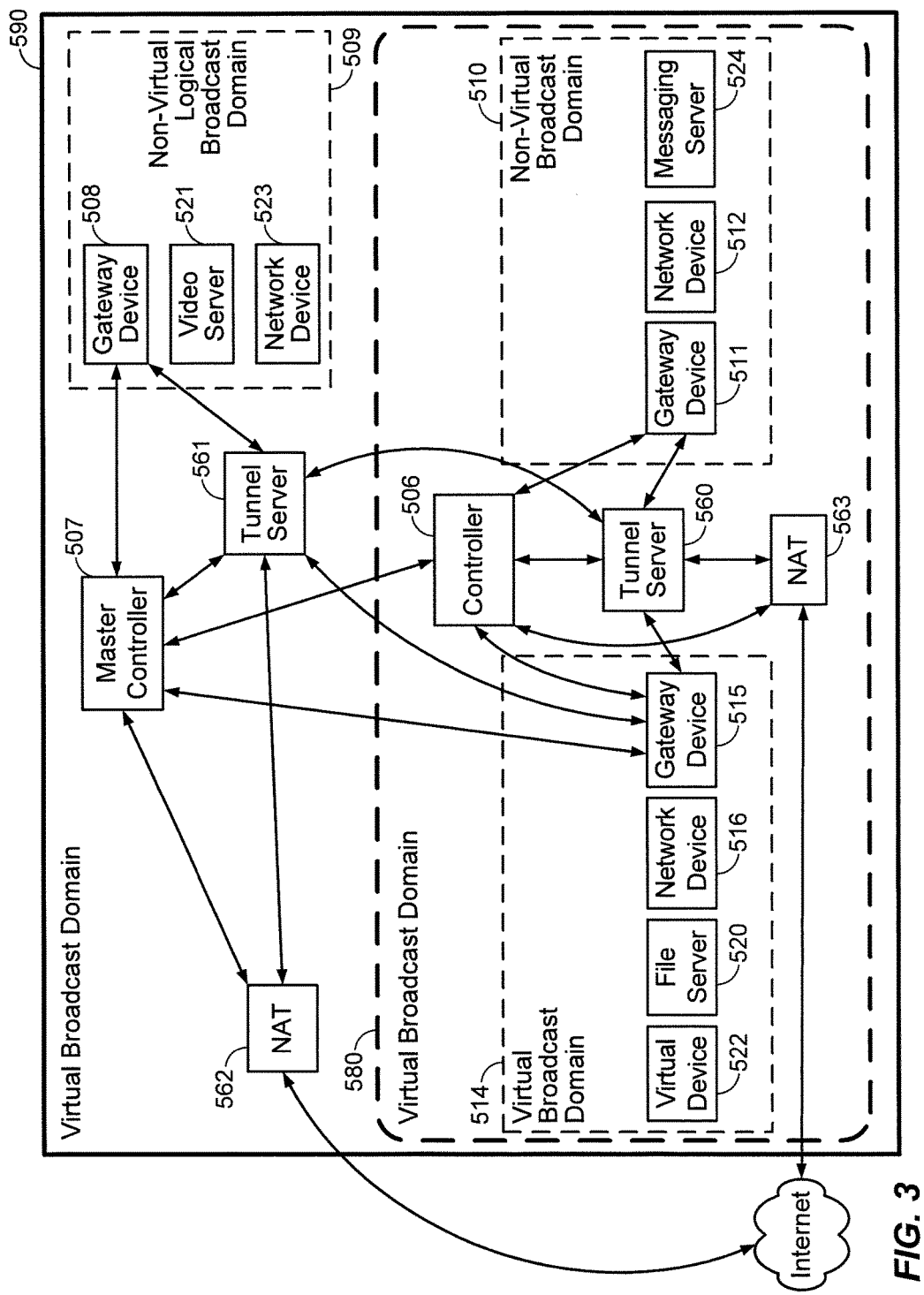
FIG. 3 is a schematic diagram illustrating yet another embodiment.

FIG. 3 is a schematic diagram illustrating still another embodiment 590 of a virtual broadcast domain comprising a plurality of logical broadcast domains. In one embodiment, respective gateway devices (e.g., 511, 515) may generate respective broadcast domain configurations and may, for example, initiate transmission to a controller, such as 506, for example, via a router. That is, it is not necessarily required that a tunnel server always be employed, such as, for example, if network devices are network addressable, such as via an IP address, for example.

Respective gateway devices (e.g., 511, 515) may request from a controller, such as 506, broadcast domain configurations of other logical broadcast domains and may emulate the generated broadcast domain configurations via the respective logical broadcast domains of which the respective gateway devices may be a part. Likewise, a gateway device may, instead, request that a controller, for example, instruct a gateway device to initiate transmission of a generated broadcast domain configuration to a requesting gateway device. In one embodiment, gateway device 515 may, for example, request a generated broadcast domain configuration from controller 506 corresponding to non-virtual broadcast domain 510, for example. Likewise, gateway device 511 may request a generated broadcast domain configuration from controller 506 corresponding to virtual broadcast domain 580.

In one embodiment, devices communicating as part of virtual broadcast domain 514 may communicate with devices operating as part of non-virtual broadcast domain 510. In one illustrative embodiment, this may be accomplished via a tunnel server, such as 560. Tunnel server 560 may, for example, execute software capable of receiving and sending signal packets from network devices in different logical broadcast domains that may otherwise use separate routers, for example. If, for example, the separate routers include a routing table or similar mechanism such that signal packets intended to reach another logical broadcast domain are routed to a tunnel server, such as 560, then, in this example embodiment, as a result, network address translation may be by-passed. Thus, devices, such as network devices, may communicate with tunnel server 560 and tunnel server 560 may forward traffic between devices, such as on different logical broadcast domains.

Thus, for example, if virtual broadcast domain 514 provides a signal packet A to tunnel server 560, it may be encapsulated. Likewise, if non-virtual broadcast domain 510 provides a signal packet B to tunnel server 560, it may be encapsulated. However, in an embodiment, a tunnel server may remove encapsulation (e.g., referred to as termination) to determine where to forward a signal packet and re-encapsulate it for forwarding so that it may be routed via intermediate network devices. As discussed previously, in this context, this may be referred to as a private network hop, which provides a capability to monitor and/or measure network traffic as well as create a virtual online presence for deployment of network-related features largely on demand. Likewise, in an embodiment, as a few non-limiting illustrative examples, encapsulation may include encryption as well, or may separate encapsulation from termination.

As previously mentioned, a tunnel server, for example, may be employed to monitor and/or measure network traffic. To do so may involve, for example, termination of signal packet encapsulation. After termination of encapsulation, subsequent re-encapsulation may then permit a signal packet to continue to traverse a private network in an embodiment. A process of termination of encapsulation and re-encapsulation may in this context be termed a private network "hop." Implementation of a private network "hop," in an embodiment, provides, in addition to centralized management of a private network, as previously mentioned, a capability to generate or provide a mechanism for deployment of network-related features, for example, network configuration and/or reconfiguration services, network resource additions and/or reductions, and/or network application additions and/or reductions, to provide only a few out of a host of possible examples.

Although claimed subject matter is not limited in scope in this respect, virtual deploying of network-related features may comprise intercepting private network signal packet transmissions via one or more devices, such as virtual devices. Typically, although not necessarily, intercepting private network signal packet transmissions may comprise intercepting any and all private network outbound and inbound signal packet transmissions. As discussed, in an embodiment, interception network traffic may take place via a private network hop for private network signal packet transmissions. For example, a private network hop may be implemented in connection with a tunnel server. Likewise, of course, multiple private network hops may be employed to intercept network traffic, such as at various locations of a private network (e.g., where private network traffic is accessible).

Although claimed subject matter is not limited in scope to particular performance parameters, since a host of different performance parameters may be used with adequate results, examples may include, in a particular unit of time: throughput, utilization, latency, outage, jitter, congestion, quality (e.g., quality of service), or any combinations thereof. Typically, outage refers to a network connection failure, such as where a route in essence goes "open circuit." Congestion generally refers to a situation in which signal packets are dropped. The terms jitter and quality of service, although generally well-understood by those of ordinary skill in the relevant art, may at times vary somewhat in terms of actual measurement with a particular context or situation. It is likewise noted that a variety of potential routes may be monitored and/or measured in order to generate performance results for use in reconfiguration determinations to take place without human intervention. For example, two or more routes between two nodes may be compared; a complete loop may be evaluated, a entire private network, a subnetwork, a logical broadcast domain, etc., etc., or any combinations thereof. The possible routes are virtually limitless and, likewise, a large number of possibilities exist. Likewise, an embodiment may monitor and/or measure routes by provisioning one or more tunnel servers, for example, even if a tunnel server is otherwise not being employed for directing network traffic, as a mechanism for additional measuring and/or monitoring. These are just a few examples of the almost limitless set of measurements that may be computed for a private network. Likewise, therefore, an embodiment may also include a capability to reconfigure the private network without human intervention to improve network performance and/or to reduce network cost and/or a capability to reconfigure the private network including reallocation of network resources and/or geographical reconfiguration of the private network, such as substantially in accordance with various measured network performance and/or cost parameters so as to result in adjustment and/or tuning thereof.

In an embodiment, tunnel server 560 may be controlled at least in part by a controller 506. For example, tunnel server 560 may be instructed to forward network transmission signal packets from gateway device 515 to gateway device 511, and forward network transmission signal packets from gateway device 511 to gateway device 515, for an embodiment, for example. For an embodiment, gateway device 515 in virtual broadcast domain 514 and gateway device 511 in non-virtual broadcast domain 510 may be linked for at least a period of time, in this example, by tunnel server 560, resulting in a path for signal packet network communications between gateway device 515 and gateway device 511 and thereby forming a virtual BD, at least for a period of time, so as to forming a secure, private network, for example.

Signal packets from gateway device 515 may comprise network communication signal packets transmitted via virtual broadcast domain 514 from network device 516, and signal packets from gateway device 511 may comprise network communication signal packets transmitted via non-virtual broadcast domain 510 from network device 512. Gateway devices forwarding signal packets, or variations thereof, as part of respective logical broadcast domains, for example, may allow other devices, such as network devices, communicating as part of the respective logical broadcast domain to communicate with network devices in different, other logical broadcast domains as if part of a single logical broadcast domain but without a significant change in configuration etc. for the participating logical broadcast domains, referred to here as forming a virtual broadcast domain.

In an embodiment, network device 516 may access and/or communicate with messaging server 524, and network device 512 may access and/or communicate with file server 520. Additionally, a virtual device 522, via a traditional VPN in this example in communication with virtual broadcast domain 514, may access and/or communicate with network devices communicating as part of non-virtual broadcast domain 510, such as network device 512, or messaging server 524, for example. No additional substantial configuration changes or modifications are necessarily involved to accomplish such as result beyond those to communicate with virtual broadcast domain 514. In an embodiment, such as this example, a virtual broadcast domain 580, may be generated at least for a period of time by linking virtual broadcast domain (e.g., a logical broadcast domain) 514 with non-virtual broadcast domain (e.g., a logical broadcast domain) 510.

Tunnel server 560 may likewise receive signal packets from devices communicating as part of other logical broadcast domains. For example, tunnel server 560 may receive network communication signal packets from gateway device 515 communicating as part of virtual broadcast domain 514, and also from gateway device 511 communicating as part of non-virtual broadcast domain 510. Tunnel server 560 may receive network communication signal packets from gateway device 515 and forward network communication signal packets to gateway device 511, for example. Tunnel server 560 may also receive signal packets from gateway device 511 and forward signal packets to gateway device 515, for example. In an embodiment, this may allow gateway device 515 and gateway device 511 to communicate, in this example, bypassing for the respective broadcast domains execution or implementation of NAT by routers, or another or similar address modification technique, for example. Likewise, tunnel server 560, for example, may provide a private network hop for virtual deployment of network-related features.

In another embodiment, virtual broadcast domain 514 may employ a different network protocol than non-virtual broadcast domain 510, such as a different network discovery protocol, for example. In one embodiment, a controller, such as controller 506, may translate a generated broadcast domain configuration, such as by modifying network transmission signal packets comprising the generated broadcast domain configuration for virtual broadcast domain 514 so as to be substantially compatible with or substantially complaint with non-virtual broadcast domain 510, such as, for example, its particular network discovery protocol. In another embodiment, a controller may initiate a gateway device to modify a generated broadcast domain configuration, such as for virtual broadcast domain 514, for example, so as to be substantially compatible with or substantially compliant with non-virtual broadcast domain 510, such as, for example, its particular network discovery protocol. Likewise, rather than being initiated, such as by a controller, perhaps a difference in protocol, such as a network discovery protocol, may be detected, such as by a gateway device and, with or without being initiated, a gateway device may translate features, such as discovery related features, of the generated broadcast domain configuration in an embodiment. For example, in one illustrative embodiment, devices communicating as part of virtual broadcast domain 514 may perform discovery via WS-Discovery, previously referenced, and devices communicating as part of non-virtual broadcast domain 510 may do so via Bonjour, available from Apple Inc., Cupertino, Calif., see, for example, https://developer.apple.com/bonjour/. Thus, a gateway device may, for example, convert a generated broadcast domain configuration from WS-Discovery to Bonjour for substantial compliance or substantial compatibility within logical broadcast domain including gateway device. Of course, this is merely an illustrative embodiment and claimed subject matter is not limited in scope to illustrative embodiments.

In this context, 'IPv4' refers to using signal packets substantially compatible or substantially compliant with Internet Protocol version 4, also referred to as IPv4 signal packets in this context. IPv4 is described in IETF publication RFC 791 (September 1981), replacing an earlier definition (RFC 760, January 1980). IPv6 refers to using signal packets substantially compatible or substantially compliant with Internet Protocol version 6, also referred to as IPv6 signal packets. IPv6 is described in IETF publication RFC 2460, published in December 1998. Gateway device 511 in an embodiment, for example, may communicate using IPv4 signal packets or IPv6 signal packets. It is noted, of course, that claimed subject matter is not limited in scope to IPv4 and/or IPv6 signal packets. Any one of a host of known or to be developed signal packets, such as network communication signal packets, may be employed. Nonetheless, in this illustrative example, network communications between gateway device 511 and tunnel server 560 may, for example, comprise IPv6 signal packets. Network communications between gateway device 511 and network device 512 may, for example, comprise IPv4 signal packets.

In an embodiment, gateway device 511, for example, may assign IPv6 addresses to IPv4 network devices communicating as part of non-virtual broadcast domain 510, without transmitting the IPv6 addresses to the IPv4 devices. In this embodiment, a device, such as a network device 512, may communicate using IPv4 signal packets whereas file server 520 may communicate using IPv6 signal packets. For example, network device 512 may request services from file server 520. In an embodiment, gateway device 511 may translate IPv4 signal packets from network device 512 to IPv6 signal packets to be forwarded via tunnel server 560 to file server 520. Response signal packets transmitted to gateway device 511 may be translated from IPv6 signal packets to IPv4 signal packets, such that they may be readily understood and/or processed by network device 512, communicating using IPv4 signal packets. In this context, a gateway device may, for example, perform translate services so that devices of a logical broadcast domain that communicate using IPv4 signal packets may be able to communicate with devices of a logical broadcast domain that communicate using IPv6 signal packets, for example. In another embodiment, tunnel server 560 may provide translation between IPv4 and IPv6 signal packets, such that gateway device 511 communicates using IPv4 signal packets without necessarily performing translation.

In one embodiment, gateway device 515, may assign IPv6 addresses to other devices communicating as part of virtual broadcast domain 514, such as, network device 516, file server 520, or virtual device 522, in addition to already assigned IPv4 addresses. Gateway device 515 may also provide updated routing tables to other devices communicating as part of virtual broadcast domain 514, such as, network device 516, file server 520, or virtual device 522.

In another embodiment, linking with another logical broadcast domain may potentially result in a multi-layered collection or nesting of logical broadcast domains. For example, in one embodiment, a virtual broadcast domain 580 may comprise virtual broadcast domain 514 and non-virtual broadcast domain 510, linked as previously discussed. Gateway device 515 may generate and forward a broadcast domain configuration to controller 506. Gateway device 515, may also forward signal packets, or derivatives thereof, from devices communicating as part of virtual broadcast domain 514, to tunnel server 560.

Virtual broadcast domain 590 may comprise linking virtual broadcast domain 580 and non-virtual broadcast domain 509. Gateway device 515, operating as a gateway device for virtual broadcast domain 580, may transmit a broadcast domain configuration for virtual broadcast domain 580 to master controller 507. Master controller 507 may request and/or receive a broadcast domain configuration from another controller, such as controller 506, for example. In an embodiment, therefore, gateway device 515 may in effect concurrently operate as a gateway device for different virtual broadcast domains. Of course, as previously described, an alternate approach may employ signal packet transmissions between tunnel servers, such as between 560 and 561 of FIG. 3, or another approach.

As discussed previously, NAT implemented by routers are by-passed for signal packet transmissions within a private network, such as in this example; nonetheless, one or more NAT devices may be included for connecting or linking a private network to the Internet, as previously suggested. As mentioned, a feature may include implementing a private network policy and inspection process, which may, for example, include a unified networking policy being implemented across a private network, such as, for example, implementing virus scanning, authentication, filtering, (for example, URL filtering) deep packet inspection, encryption, a firewall, any combinations thereof, etc. Likewise, as previously described, selected networking policies for selected portions of a private network may be implemented as a private network policy and inspection process. Thus, for example, referring to FIG. 3, a NAT device 562 coupled to tunnel server 561 is able to connect the private network to the Internet by implementing network address translation for signal packets outbound from TS 561 to the Internet. As shown in FIG. 3, NAT device 563 provides a similar capability for TS 560. Likewise, the NATs may also receive inbound signal packet transmissions which may be forwarded as appropriate. Although claimed subject matter is not necessarily limited in scope in this respect, additional example embodiments of connecting to the Internet via a NAT (along with related technology) may be discussed in U.S. patent application Ser. No. 13/802,529, titled "CONNECTING A CLOUD NETWORK TO THE INTERNET," filed on Mar. 13, 2012, by Hankins et al., herein incorporated by reference in its entirety and assigned to the assignee of currently claimed subject matter.

Figure 5:
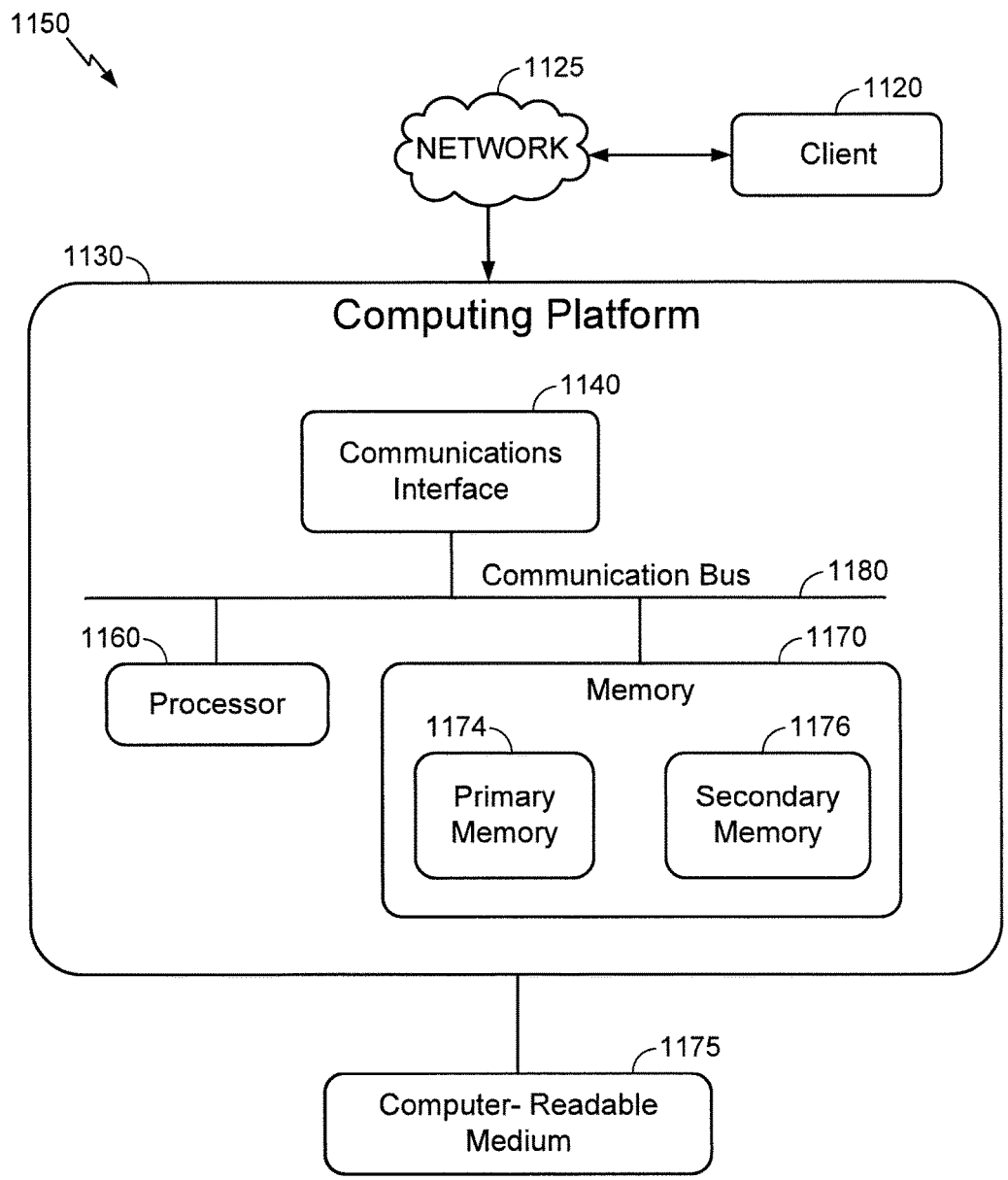
FIG. 5 is a schematic diagram illustrating a computing environment in which an embodiment may be implemented.

For purposes of illustration, FIG. 5 is an illustration of an embodiment of a computing platform 1150 that may be employed in a client-server type interaction, such as described infra. in connection with rendering a GUI via a device, such as a network device and/or a computing device, for example. In FIG. 5, computing platform 1130 may interface with client 1120, which may comprise features of a conventional client device, for example. Communications interface 1140, processor (e.g., processing unit) 1160, and memory 1170, which may comprise primary memory 1174 and secondary memory 1176, may communicate by way of communication bus 1180, for example. In FIG. 5, client 1120 may represent one or more or more sources of analog, uncompressed digital, lossless compressed digital, or lossy compressed digital formats for content of various types, such as video, imaging, text, audio, etc. in the form physical states or signals, for example. Client 1120 may communicate with computing platform 1130 by way of an Internet connection via network 1125, for example. Although the computing platform of FIG. 5 shows the above-identified components, claimed subject matter is not limited to computing platforms having only these components as other implementations may include alternative arrangements that may comprise additional components, fewer components, or components that function differently while achieving similar results. Rather, examples are provided merely as illustrations. It is not intended that claimed subject matter to limited in scope to illustrative examples.

Processor 1160 may be representative of one or more circuits, such as digital circuits, to perform at least a portion of a computing procedure or process. By way of example, but not limitation, processor 1160 may comprise one or more processors, such as controllers, microprocessors, microcontrollers, application specific integrated circuits, digital signal processors, programmable logic devices, field programmable gate arrays, and the like, or any combination thereof. In implementations, processor 360 may perform signal processing to manipulate signals or states and/or to construct signals or states, for example.

Memory 1170 may be representative of any storage mechanism. Memory 1170 may comprise, for example, primary memory 1174 and secondary memory 1176, additional memory circuits, mechanisms, or combinations thereof may be used. Memory 370 may comprise, for example, random access memory, read only memory, or one or more data storage devices or systems, such as, for example, a disk drive, an optical disc drive, a tape drive, a solid-state memory drive, just to name a few examples. Memory 1170 may be utilized to store a program. Memory 1170 may also comprise a memory controller for accessing computer readable-medium 1175 that may carry and/or make accessible content, code, and/or instructions, for example, executable by processor 1160 or some other controller or processor capable of executing instructions, for example.

Under the direction of processor 1160, memory, such as memory cells storing physical states, representing for example, a program, may be executed by processor 1160 and generated signals may be transmitted via the Internet, for example. Processor 1160 may also receive digitally-encoded signals from client 1120.

Network 1125 may comprise one or more network communication links, processes, services, applications and/or resources to support exchanging communication signals between a client, such as 1120 and computing platform 1130, which may, for example, comprise one or more servers (not shown). By way of example, but not limitation, network 1125 may comprise wireless and/or wired communication links, telephone or telecommunications systems, Wi-Fi networks, Wi-MAX networks, the Internet, a local area network (LAN), a wide area network (WAN), or any combinations thereof.

The term "computing platform," as used herein, refers to a system and/or a device, such as a computing device, that includes a capability to process (e.g., perform computations) and/or store data in the form of signals and/or states. Thus, a computing platform, in this context, may comprise hardware, software, firmware, or any combination thereof (other than software per se). Computing platform 1130, as depicted in FIG. 5, is merely one such example, and the scope of claimed subject matter is not limited to this particular example. For one or more embodiments, a computing platform may comprise any of a wide range of digital electronic devices, including, but not limited to, personal desktop or notebook computers, high-definition televisions, digital versatile disc (DVD) players and/or recorders, game consoles, satellite television receivers, cellular telephones, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing platform.

Memory 1170 may store cookies relating to one or more users and may also comprise a computer-readable medium that may carry and/or make accessible content, code and/or instructions, for example, executable by processor 1160 or some other controller or processor capable of executing instructions, for example. A user may make use of an input device, such as a computer mouse, stylus, track ball, keyboard, or any other similar device capable of receiving user actions and/or motions as input signals. Likewise, a user may make use of an output device, such as a display, a printer, etc., or any other device capable of providing signals, generating visual or audio stimuli or other similar output stimuli for a user.

Regarding aspects related to a communications or computing network, a wireless network may couple client devices with a network. A wireless network may employ stand-alone ad-hoc networks, mesh networks, Wireless LAN (WLAN) networks, cellular networks, and/or the like. A wireless network may further include a system of terminals, gateways, routers, or the like coupled by wireless radio links, and/or the like, which may move freely, randomly or organize themselves arbitrarily, such that network topology may change, at times even rapidly. Wireless network may further employ a plurality of network access technologies, including Long Term Evolution (LTE), WLAN, Wireless Router (WR) mesh, 2nd, 3rd, or 4th generation (2G, 3G, or 4G) cellular technology, other technologies, and/or the like. Network access technologies may enable wide area coverage for devices, such as client devices with varying degrees of mobility, for example.

A network may enable radio frequency or other wireless type communications via a network access technology, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or other, or the like. A wireless network may include virtually any type of now known, or to be developed, wireless communication mechanism by which signals may be communicated between devices, such as a client device, such as a computing device and/or a network device, between or within a network, or the like.

Communications between a computing device and/or a network device and a wireless network may be in accordance with known, or to be developed cellular telephone communication network protocols including, for example, global system for mobile communications (GSM), enhanced data rate for GSM evolution (EDGE), and worldwide interoperability for microwave access (WiMAX). A computing device and/or a networking device may also have a subscriber identity module (SIM) card, which, for example, may comprise a detachable smart card that is able to store subscription information of a user, and/or is also able to store a contact list of the user. A user may own the computing device and/or networking device or may otherwise be a user, such as a primary user, for example. A computing device may be assigned an address by a wireless or wired telephony network operator, or an Internet Service Provider (ISP). For example, an address may comprise a domestic or international telephone number, an Internet Protocol (IP) address, and/or one or more other identifiers. In other embodiments, a communication network may be embodied as a wired network, wireless network, or any combinations thereof.

A device, such as a computing and/or networking device, may vary in terms of capabilities and/or features. Claimed subject matter is intended to cover a wide range of potential variations. For example, a device may include a numeric keypad or other display of limited functionality, such as a monochrome liquid crystal display (LCD) for displaying text, for example. In contrast, however, as another example, a web-enabled device may include a physical or a virtual keyboard, mass storage, one or more accelerometers, one or more gyroscopes, global positioning system (GPS) or other location-identifying type capability, and/or a display with a higher degree of functionality, such as a touch-sensitive color 2D or 3D display, for example.

A computing and/or network device may include or may execute a variety of now known, or to be developed operating systems, derivatives and/or versions thereof, including personal computer operating systems, such as a Windows, iOS, Linux, a mobile operating system, such as iOS, Android, Windows Mobile, and/or the like. A computing device and/or network device may include or may execute a variety of possible applications, such as a client software application enabling communication with other devices, such as communicating one or more messages, such as via email, short message service (SMS), and/or multimedia message service (MMS), including via a network, such as a social network including, but not limited to, Facebook, LinkedIn, Twitter, Flickr, and/or Google+, to provide only a few examples. A computing and/or network device may also include or execute a software application to communicate content, such as, for example, textual content, multimedia content, and/or the like. A computing and/or network device may also include or execute a software application to perform a variety of possible tasks, such as browsing, searching, playing various forms of content, including locally stored or streamed video, or games such as, but not limited to, fantasy sports leagues. The foregoing is provided merely to illustrate that claimed subject matter is intended to include a wide range of possible features or capabilities.

A logical broadcast domain may also be extended to another device communicating as part of another network, such as via a virtual private network (VPN). To support a VPN, logical broadcast domain transmissions may be forwarded to the VPN device via another network. For example, a software tunnel may be created between a logical broadcast domain, and a VPN device. Tunneled traffic may, or may not be encrypted, and a tunneling protocol may be substantially compliant with and/or substantially compatible with any past, present or future versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, another existing protocol, and/or another protocol that may be developed.

A logical broadcast domain may communicate via signal packets, such as in a network of participating digital communications, A logical broadcast domain may be compatible with now known, or to be developed, past, present, or future versions of any, but not limited to the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A logical broadcast domain may employ, for example, TCP/IP, UDP, DECnet, NetBEUI, IPX, Appletalk, other, and/or the like. Versions of the Internet Protocol (IP) may include IPv4, IPv6, other, and/or the like.

It will, of course, be understood that, although particular embodiments will be described, claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example (other than software per se). Likewise, although claimed subject matter is not limited in scope in this respect, one embodiment may comprise one or more articles, such as a storage medium or storage media. Storage media, such as, one or more CD-ROMs and/or disks, for example, may have stored thereon instructions, executable by a system, such as a computer system, computing platform, and/or other system, such as a computing device and/or a network device, for example, that may result in an embodiment of a method in accordance with claimed subject matter being executed, such as a previously described embodiment, for example; although, of course, claimed subject matter is not limited to previously described embodiments. As one potential example, a computing platform may include one or more processing units or processors, one or more devices capable of inputting/outputting, such as a display, a keyboard and/or a mouse, and/or one or more memories, such as static random access memory, dynamic random access memory, flash memory, and/or a hard drive.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involves physical manipulation of physical quantities. Typically, although not necessarily, such quantities may take the form of electrical and/or magnetic signals and/or states capable of being stored, transferred, combined, compared, processed or otherwise manipulated as electronic signals and/or states representing information. It has proven convenient at times, principally for reasons of common usage, to refer to such physical signals and/or physical states as bits, data, values, elements, symbols, characters, terms, numbers, numerals, information, and/or the like. It should be understood, however, that all of these or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other information storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

While there has been illustrated and/or described what are presently considered to be example features, it will be understood by those skilled in the relevant art that various other modifications may be made and/or equivalents may be substituted, without departing from claimed subject matter. Additionally, many modifications may be made to adapt a particular situation to the teachings of claimed subject matter. Therefore, it is intended that claimed subject matter not be limited to the particular examples disclosed, but that such claimed subject matter may also include all aspects falling within appended claims and/or equivalents thereof.

The invention claimed is:

1. A method comprising: managing without human intervention at least one private network;
   wherein the at least one private network comprises two or more separate logical broadcast domains in which the at least one private network is able to communicate selected signal packets from one network device in one of the two or more separate logical broadcast domains transmitted to one network device in another of the two or more separate logical broadcast domains via at least one tunnel server such that the at least one private network is able to communicate the selected signal packets from the one network device in one of the two or more separate logical broadcast domains transmitted to the one network device in another of the two or more separate logical domains as if the logical broadcast domains are not logically separate, and while by-passing use of a routing table with respect to the selected signal packets; and
   wherein the managing the at least one private network comprises managing signal packet communications between the network devices in the two or more separate logical broadcast domains.

2. The method of claim 1, wherein the one network device in the another of the two or more separate logical broadcast domains comprises a stand-alone network device remote with respect to at least the one logical broadcast domain.

3. The method of claim 2, wherein the at least one private network comprises a controller, and wherein the controller provisions at least another tunnel server at least for a period of time, wherein the managing the one stand-alone network device comprises managing the paths of signal packet communications to and/or from the stand-alone network device via the tunnel servers.

4. The method of claim 3, wherein the paths of signal packet communications to and/or from the one stand-alone network device via the tunnel servers are managed based at least in part on one or more of the following: cost, capability, efficiency, compatibility, resources, proximity, security, load balancing, fault tolerance, redundancy or any combinations thereof.

5. The method of claim 2, and further comprising multiple additional stand-alone network devices, wherein at least some of the multiple additional stand-alone network devices are included in the at least one private network and wherein remaining networks devices of the multiple additional stand-alone network devices are included in private networks other than the at least one private network; wherein the at least some of the multiple additional stand-alone network devices are managed along with the one stand-alone network device as part of the at least one private network and wherein the remaining network devices are managed as part of private networks other than the at least one private network.

6. The method of claim 5, wherein the managing the multiple additional stand-alone network devices includes managing the paths of signal packet communications to and/or from the multiple additional stand-alone network devices via the at least one tunnel server.

7. The method of claim 6, wherein the at least one private network comprises a controller, and wherein the controller provisions at least another tunnel server at least for a period of time, wherein the managing the multiple additional stand-alone network devices includes managing the paths of signal packet communications to and/or from the multiple additional stand-alone network devices via the tunnel servers.

8. The method of claim 7, wherein the paths of signal packet communications to and/or from the multiple additional stand-alone network devices via the tunnel servers are managed based at least in part on one or more of the following: cost, capability, efficiency, compatibility, resources, proximity, security, load balancing, fault tolerance, redundancy or any combinations thereof.

9. The method of claim 8, wherein the managing the paths of signal packet communications to and/or from the multiple additional stand-alone network devices via the tunnel servers includes employing more than one tunnel server for signal packet communications between any of the multiple additional stand-alone network devices and the one network device in the another of the two or more separate logical domains based at least in part on one or more of the following: cost, capability, efficiency, compatibility, resources, proximity, security, load balancing, fault tolerance, redundancy or any combinations thereof.

10. The method of claim 9, wherein the employing more than one tunnel server for signal packet communications between the any of the multiple additional stand-alone network devices and the one network device in the another of the two or more separate logical domains includes concurrently employing more than one tunnel server for signal packet communications between the any of the multiple additional stand-alone network devices and the one network device in the another of the two or more separate logical domains based at least in part on one or more of the following: cost, capability, efficiency, compatibility, resources, proximity, security, load balancing, fault tolerance, redundancy or any combinations thereof.

11. The method of claim 5, wherein each of the stand-alone network devices comprises a separate logical broadcast domain.

12. The method of claim 5, wherein at least one of the private networks other than the at least one private network is managed without human intervention.

13. The method of claim 5, wherein at least one of the private networks other than the at least one private network is managed by a different controller.

14. The method of claim 2, wherein the one stand-alone network device comprises a separate logical broadcast domain, and wherein the managing the at least one private network comprises managing the at least one stand-alone network device and the one network device in the another of the two or more separate logical domains.

15. The method of claim 14, wherein the another of the two or more separate logical domains comprises another network device; and wherein the managing the at least one private network further includes also managing the another network device.

16. The method of claim 1, wherein the managing comprises: provisioning at least one tunnel server to communicate between the two or more separate logical broadcast domains.

17. The method of claim 16, wherein the provisioning of the at least one tunnel server occurs based at least in part on one or more signals from a controller.

18. The method of claim 17, and further comprising one or more stand-alone remote network devices, wherein the managing the at least one private network includes managing the one or more stand-alone remote network devices, and wherein the managing the one or more stand-alone remote network devices includes managing signal packet communications to and/or from the one or more stand-alone remote network devices.

19. The method of claim 18, wherein the controller provisions at least another tunnel server at least for a period of time, wherein the managing the paths of signal packet communications to and/or from the one or more stand-alone remote network devices comprises the managing the paths of signal packet communications to and/or from the one or more stand-alone remote network devices via the tunnel servers, and wherein the managing the paths of signal packet communications to and/or from the one or more stand-alone remote network devices via the tunnel servers comprises managing the paths of signal packet communications to and/or from the one or more stand-alone remote network devices via the tunnel servers based at least in part on one or more of the following: cost, capability, efficiency, compatibility, resources, proximity, security, load balancing, fault tolerance, redundancy or any combinations thereof.

20. The method of claim 1, and further comprising multiple additional stand-alone remote network devices, wherein at least some of the multiple additional stand-alone remote network devices are included in the at least one private network and wherein remaining network devices of the multiple additional stand-alone remote network devices are included in private networks other than the at least one private network; wherein the managing the at least one private network includes managing the at least some of the multiple additional stand-alone remote network devices along with the two or more separate logical broadcast domains as part of the at least one private network.

21. The method of claim 20, wherein the managing the multiple additional stand-alone remote network devices includes managing the paths of signal packet communications to and/or from the multiple additional stand-alone remote network devices via the at least one tunnel server along with the two or more separate logical broadcast domains as part of the at least one private network.

22. The method of claim 21, wherein the at least one private network comprises a controller, and wherein the controller provisions at least another tunnel server at least for a period of time, wherein the managing the multiple additional stand-alone remote network devices includes managing the paths of signal packet communications to and/or from the multiple additional stand-alone remote network devices via the tunnel servers along with the two or more separate logical broadcast domains as part of the at least one private network.

23. The method of claim 22, wherein the managing the paths of signal packet communications via the tunnel servers comprises managing the paths based at least in part on one or more of the following: cost, capability, efficiency, compatibility, resources, proximity, security, load balancing, fault tolerance, redundancy or any combinations thereof.

24. The method of claim 23, wherein the managing the paths of signal packet communications via the tunnel servers includes employing more than one tunnel server for signal packet communications between any of the stand-alone remote network devices and any network devices of the two or more separate logical broadcast domains based at least in part on one or more of the following: cost, capability, efficiency, compatibility, resources, proximity, security, load balancing, fault tolerance, redundancy or any combinations thereof.

25. The method of claim 24, wherein the managing the paths of signal packet communications via the tunnel servers includes concurrently employing more than one tunnel server for signal packet communications between any of the stand-alone remote network devices and any network devices of the two or more separate logical broadcast domains.

26. A system comprising: one or more servers; the one or more servers to manage at least one private network without human intervention;
wherein the at least one private network to comprise at least for a period of time a virtual broadcast domain comprising two or more separate logical broadcast domains in which the at least one private network is able to communicate selected signal packets from one network device in one of the two or more separate logical broadcast domains that are to be transmitted to one network device in another of the two or more separate logical broadcast domains via at least one tunnel server such that the at least one private network is able to communicate the selected signal packets from the one network device in the one of the two or more separate logical broadcast domains in a manner to by-pass use of a routing table with respect to the selected signal packets and as if the logical broadcast domains are not logically separate; and
wherein the one or servers are to manage signal packet communications between the network devices in the two or more separate logical broadcast domains.

27. The system of claim 26, and wherein the at least one private network is to further comprise multiple additional stand-alone remote network devices;
wherein at least some of the multiple additional stand-alone remote network devices are to be included in the at least one private network and wherein remaining network devices of the multiple additional stand-alone remote network devices are to be included in private networks other than the at least one private network; and
wherein the one or more servers are further to manage the at least some of the multiple additional stand-alone remote network devices along with the two or more separate logical broadcast domains as part of the at least one private network.

28. The system of claim 27, wherein the one or more servers are further to manage the multiple additional stand-alone remote network devices and are further to manage the paths of signal packet communications to and/or from the multiple additional stand-alone remote network devices via the at least one tunnel server along with the two or more separate logical broadcast domains as part of the at least one private network.

29. The system of claim 28, wherein at least one of the one or more servers comprises a controller, wherein the controller is to provision at least another tunnel server at least for a period of time, wherein the controller is further to manage the paths of signal packet communications to and/or from the multiple additional stand-alone remote network devices via the tunnel servers along with the two or more separate logical broadcast domains as part of the at least one private network.

30. The system of claim 29, wherein the controller is further to manage the paths of signal packet communications based at least in part on one or more of the following: cost, capability, efficiency, compatibility, resources, proximity, security, load balancing, fault tolerance, redundancy or any combinations thereof.

31. The system of claim 26, wherein the one network device of the another of the two or more separate logical broadcast domains is to comprise a stand-alone network device remote with respect to at least the one logical broadcast domain.

32. The system of claim 31, wherein at least one of the one or more servers comprises a controller, wherein the controller is to provision at least another tunnel server at least for a period of time, and wherein the controller is to manage the paths of signal packet communications to and/or from the stand-alone network device via the tunnel servers.

33. The system of claim 32, wherein the controller is to further to manage the paths of signal packet communications to and/or from the one stand-alone network device via the tunnel servers based at least in part on one or more of the following:
cost, capability, efficiency, compatibility, resources, proximity, security, load balancing, fault tolerance, redundancy or any combinations thereof.

34. An article comprising: a non-transitory storage medium having stored thereon instructions executable by a computing device, wherein the computing device is to comprise a controller to manage at least one private network without human intervention;
wherein the at least one private network to comprise at least for a period of time a virtual broadcast domain comprising two or more separate logical broadcast domains in which the at least one private network is able to communicate selected signal packets from one network device in one of the two or more separate logical broadcast domains to be transmitted to one network device in another of the two or more separate logical broadcast domains via at least one tunnel server such that the at least one private network is able to communicate the selected signal packets from the one network device in one of the two or more separate logical broadcast domains in a manner to by-pass use of a routing table with respect to the selected signal packets and as if the logical broadcast domains are not logically separate; and
wherein the controller is to manage signal packet communications between the network devices in the two or more separate logical broadcast domains.

35. The article of claim 34, and wherein the at least one private network is to further comprise multiple additional stand-alone remote network devices;
wherein at least some of the multiple additional stand-alone remote network devices are to be included in the at least one private network and wherein remaining network devices of the multiple additional stand-alone remote network devices are to be included in private networks other than the at least one private network; and
wherein the controller is further to manage the at least some of the multiple additional stand-alone remote network devices along with the two or more separate logical broadcast domains as part of the at least one private network.

36. The article of claim 35, wherein the controller is further to manage the multiple additional stand-alone remote network devices and is further to manage the paths of signal packet communications to and/or from the multiple additional stand-alone remote network devices via the at least one tunnel server along with the two or more separate logical broadcast domains as part of the at least one private network.

37. The article of claim 36, wherein the controller is to provision at least another tunnel server at least for a period of time, wherein the controller is further to manage the paths of signal packet communications to and/or from the multiple additional stand-alone remote network devices via the tunnel servers along with the two or more separate logical broadcast domains as part of the at least one private network.

38. The article of claim 37, wherein the controller is further to manage the paths of signal packet communications based at least in part on one or more of the following: cost, capability, efficiency, compatibility, resources, proximity, security, load balancing, fault tolerance, redundancy or any combinations thereof.

39. The article of claim 34, wherein the one network device of the another of the two or more separate logical broadcast domains is to comprise a stand-alone network device remote with respect to at least the one logical broadcast domain.

40. The article of claim 39, wherein at least one of the one or more servers to comprise a controller, wherein the controller is to provision at least another tunnel server at least for a period of time, and wherein the controller is to manage the paths of signal packet communications to and/or from the stand-alone network device via the tunnel servers.

41. The article of claim 34, wherein the controller is to further to manage the paths of signal packet communications to and/or from the one stand-alone network device via the tunnel servers based at least in part on one or more of the following: cost, capability, efficiency, compatibility, resources, proximity, security, load balancing, fault tolerance, redundancy or any combinations thereof.

* * * * *